(12) United States Patent
Chmelar et al.

(10) Patent No.: US 8,929,497 B2
(45) Date of Patent: Jan. 6, 2015

(54) DYNAMIC DESKEW FOR BANG-BANG TIMING RECOVERY IN A COMMUNICATION SYSTEM

(75) Inventors: Erik V. Chmelar, Midland, MI (US); Choshu Ito, San Mateo, CA (US)

(73) Assignee: LSI Corporation, San Jose, CA (US)

( * ) Notice: Subject to any disclaimer, the term of this patent is extended or adjusted under 35 U.S.C. 154(b) by 365 days.

(21) Appl. No.: 13/422,329

(22) Filed: Mar. 16, 2012

(65) Prior Publication Data

US 2013/0243127 A1 Sep. 19, 2013

(51) Int. Cl.
*H04L 7/00* (2006.01)
*H04L 7/033* (2006.01)

(52) U.S. Cl.
CPC ..................... *H04L 7/033* (2013.01)
USPC ......................................................... 375/355

(58) Field of Classification Search
CPC .......... H04L 7/033; H04L 7/0331; H04L 7/02
USPC ............................. 375/354, 355, 371, 373, 376
See application file for complete search history.

(56) References Cited

U.S. PATENT DOCUMENTS

| | | | |
|---|---|---|---|
| 7,183,864 B1 * | 2/2007 | Gutnik | 331/57 |
| 7,746,969 B2 * | 6/2010 | Bryan et al. | 375/349 |
| 2008/0152057 A1 * | 6/2008 | Lee et al. | 375/355 |

* cited by examiner

*Primary Examiner* — Kevin M Burd

(57) ABSTRACT

Described embodiments calibrate a sampling phase adjustment of a receiver. An analog-to-digital converter generates samples of a received signal at a sample phase. A phase detector selects a window of n samples. If the window includes a Nyquist pattern, a bang-bang trap is enabled that iteratively, for each transition between a first consecutive bit and a second consecutive bit in the Nyquist pattern, samples the received signal at a zero crossing between the first and second consecutive bits and determines the transition polarity. Based on the transition polarity and the zero crossing sample value, the bang-bang trap determines whether the sample phase is correct. If Nyquist patterns are absent from the window, a margin phase detector determines a target voltage margin value and a voltage of a cursor bit of the window. Based on the target voltage margin and voltage, the margin phase detector determines whether the sample phase is correct.

24 Claims, 28 Drawing Sheets

100

200

400

500

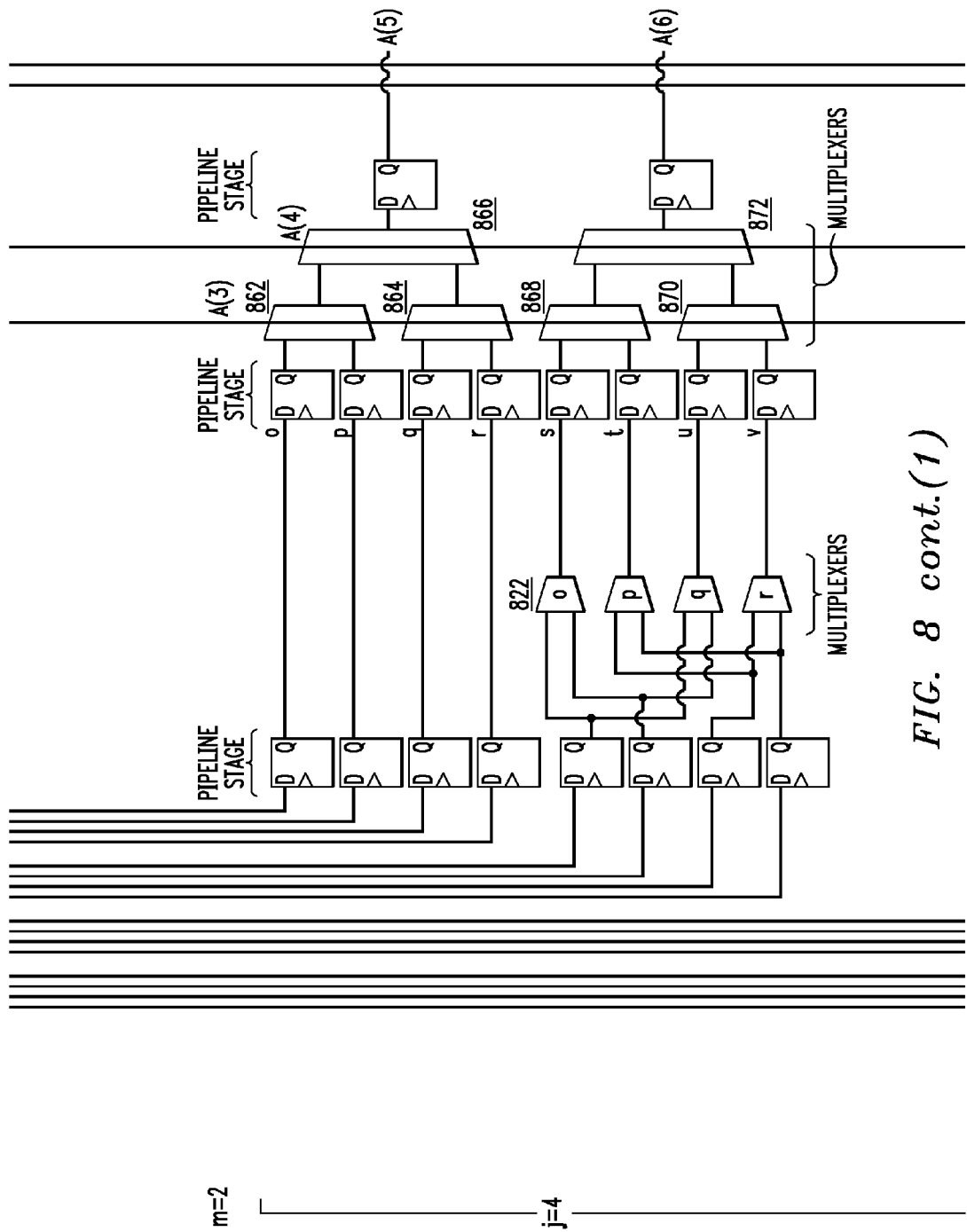

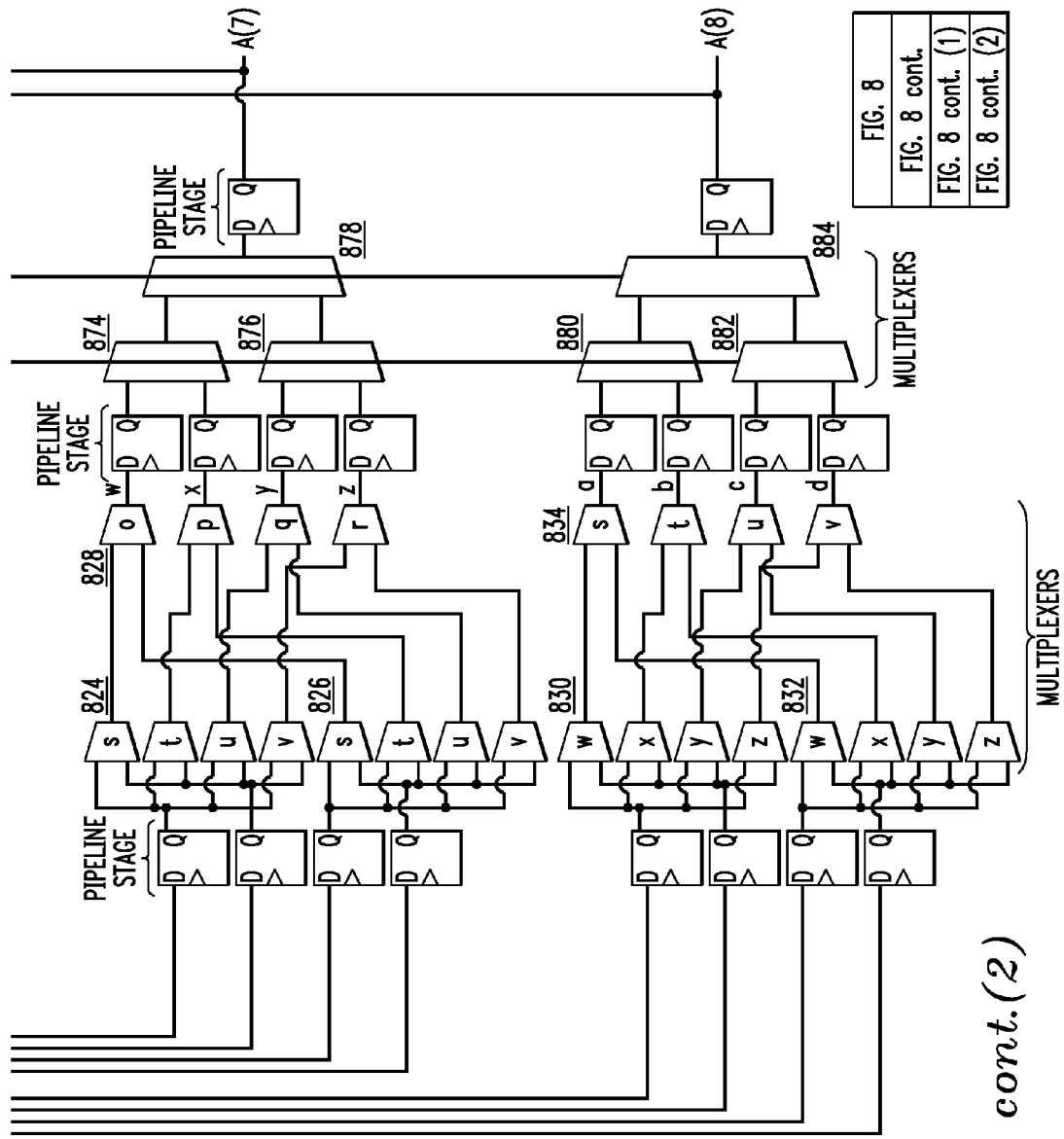
FIG. 8 cont.(2)

EARLY SAMPLING

LATE SAMPLING

1900

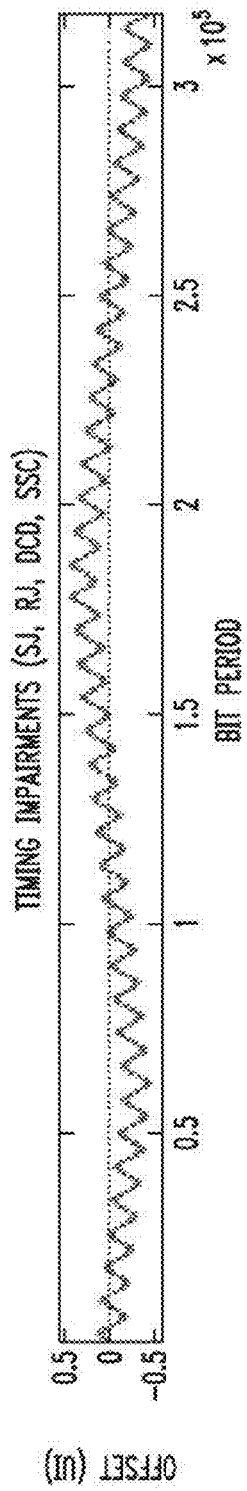
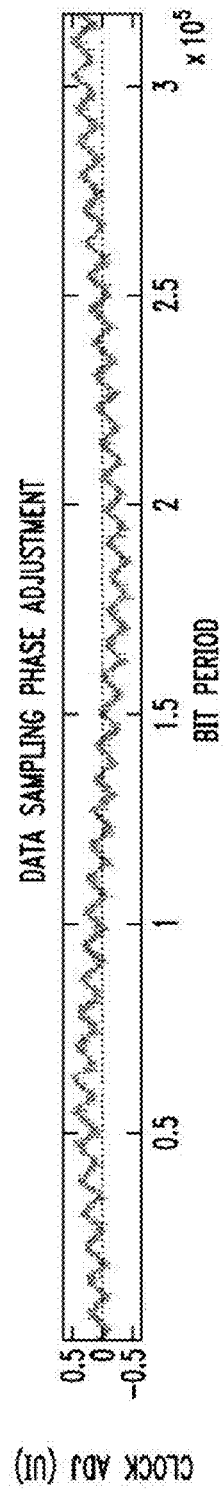
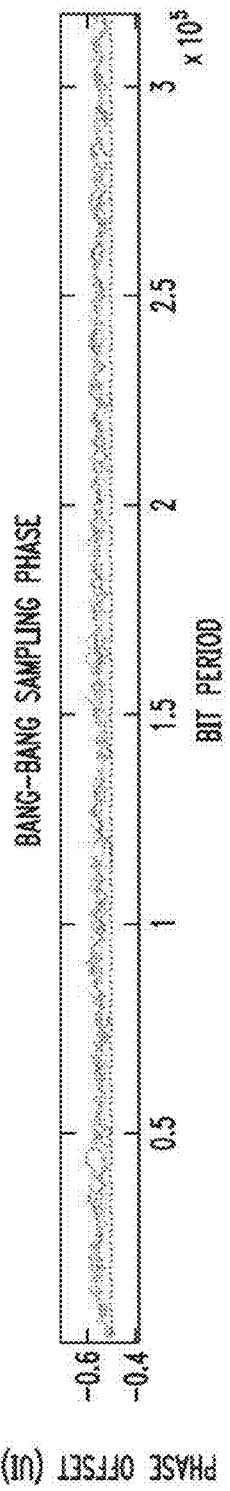
FIG. 20A — TIMING IMPAIRMENTS (SJ, RJ, DCD, SSC)
FIG. 20B — DATA SAMPLING PHASE ADJUSTMENT
FIG. 20C — BANG-BANG SAMPLING PHASE

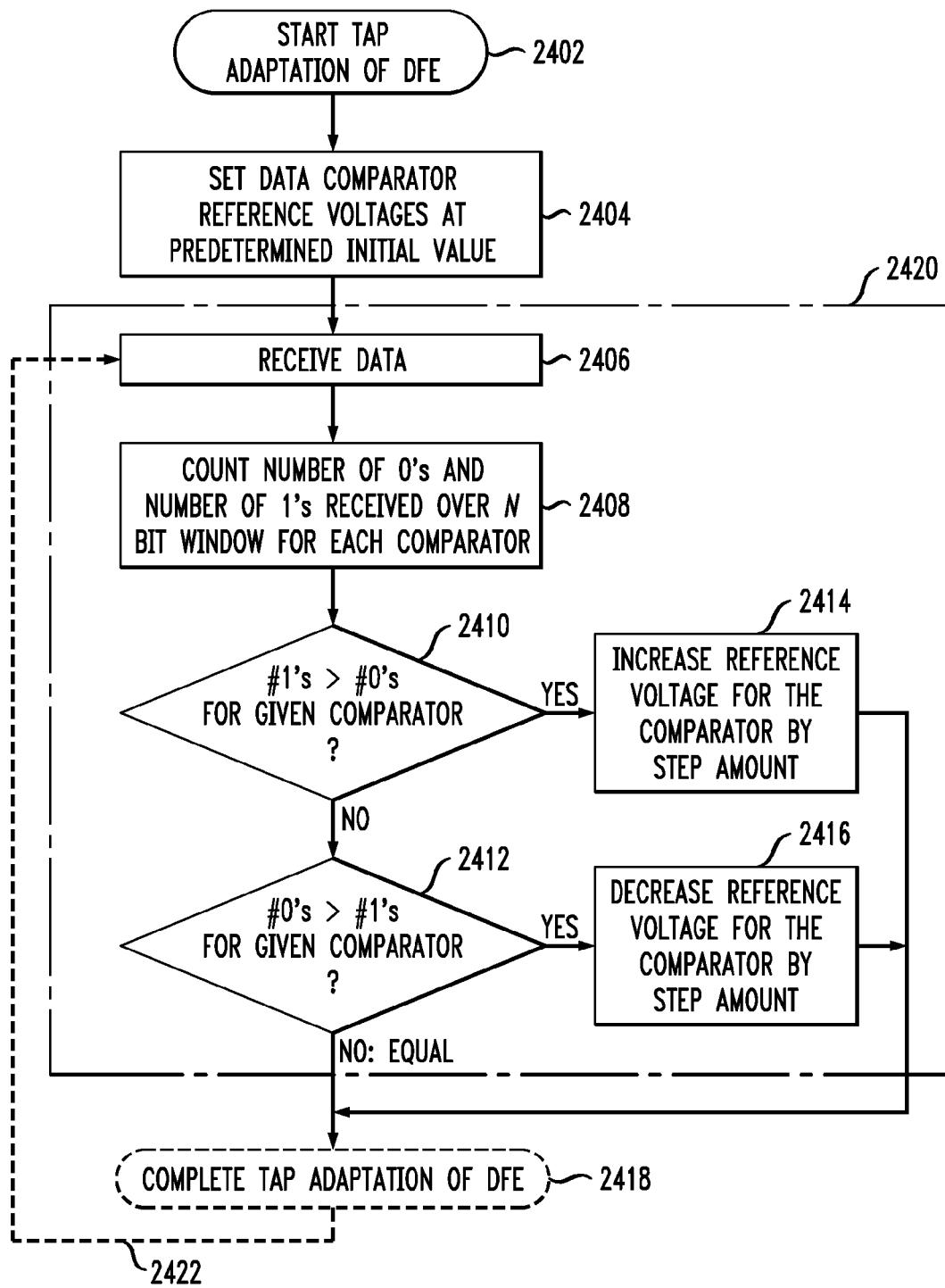

DYNAMIC DESKEW FOR BANG-BANG TIMING RECOVERY IN A COMMUNICATION SYSTEM

CROSS-REFERENCE TO RELATED APPLICATIONS

The subject matter of this application is related to U.S. patent application Ser. Nos. 13/422226, 13/422,259, 13/422,403 and Ser. No. 13/422,450, all filed on Mar. 16, 2012, the teachings of which are incorporated herein in their entireties by reference.

BACKGROUND

Digital communication receivers typically sample a received analog waveform and detect sampled data. In many data communication applications, Serializer and De-serializer (SERDES) devices facilitate the transmission between two points of parallel data across a serial link. Data at one point is converted from parallel data to serial data and transmitted through a communication channel to the second point where it is received and converted from serial data to parallel data. As clock rates of the serial links increase to meet demand for higher data throughput, transmitted signals arriving at a receiver are increasingly susceptible to corruption by frequency-dependent signal loss of the channel, such as intersymbol interference (ISI), and other noise, such as crosstalk, echo, signal dispersion and distortion.

Receivers often equalize the channel to compensate for such signal degradation to correctly decode the received signals. For example, a receiver might apply equalization to the analog received signal using an analog front-end (AFE) equalizer that acts as a filter having parameters initially based on an estimate of the channel's features. Since, in many cases, little information about the channel transfer function is available during initial signal acquisition, and since the pulse transfer function can vary with time, an equalizer with adaptive setting of parameters providing adjustable range might be employed to mitigate the degradation of the signal transmitted through the channel. Thus, once the signal is received, the analog filter parameters might be adapted based on information derived from the received analog signal.

A decision-feedback equalizer (DFE) is often used to remove ISI and other noise to determine a correct bit sequence from the received signal, and is often employed in conjunction with an AFE. Generally, a traditional DFE utilizes a nonlinear equalizer to equalize the channel using a feedback loop based on previously decided symbols from the received signal. Thus, a DFE typically determines a correct logic value of a given sample ("cursor value") of the input signal for a given symbol period in the presence of ISI based on one or more previous logic values ("pre-cursor values"). For example, a traditional DFE might subtract the sum of ISI contributions for a predetermined number of previously decoded symbols of the received signal. The ISI contributions might be determined by multiplying the previously decoded symbol values by their corresponding pulse response coefficients ("taps") of the communication channel. These products might be summed and subtracted from the received signal. Analog DFEs are generally capable of high bandwidth operation, but both power consumption and semiconductor area increase as the bandwidth increases.

Another type of DFE is an unrolled DFE such as described in U.S. Published Patent Application 2009/0304066, filed on Jun. 6, 2008 to Chmelar et al. (hereinafter "Chmelar"), which is incorporated by reference herein. For example, in the unrolled DFE of Chmelar, the feedback path is removed between the analog and digital domains that exists for a traditional DFE (e.g., the feedback path between the DFE and the AFE). The unrolled DFE precomputes the possible ISI contributions based on the received symbol history based on a first speculation that the result from processing the succeeding bit (i.e., a decision output) will be logic '1' and a second speculation that the result from processing the succeeding bit will be logic '0'. Once the result from the succeeding bit is available, the pre-calculated adjustment feedback value corresponding to the correctly speculated output value is selected to process the following input bits. In this way, latency between determination of a succeeding bit and providing a data dependent input for processing a following bit can be greatly reduced as the time required to perform adjustment calculations is effectively eliminated from the latency.

However, there are limitations of traditional DFEs and unrolled DFEs. For example, in both traditional and unrolled DFEs, pre-cursor ISI cannot be equalized since a DFE is a causal system and for a DFE to recover a symbol and feedback its ISI contribution to equalize the received signal, the symbol must have already been received and a DFE does not predict future symbols. This is an unfortunate limitation since both future symbols (pre-cursor) and past symbols (post-cursor) contribute to ISI. Although pre-cursor ISI was negligible at lower baud rates, as baud rates have increased to tens of gigabits per second through channels whose transmission properties have not improved proportionally, unequalized pre-cursor ISI has become increasingly significant in degrading the Bit Error Ratio (BER) of the system.

Further, a traditional DFE is limited to performing the ISI determination and subtraction in a single symbol period (a "unit interval" or UI). The UI is the baud rate of the SERDES channel, which can be in excess of 12 Gbps. This single UI timing requirement ("DFE iteration bound") dictates the maximum frequency at which the DFE can operate. To meet the DFE iteration bound at high baud rates, drive strength of some analog circuitry might be increased, which undesirably increases power consumption of the receiver. In an unrolled DFE, although the feedback between the AFE and the DFE is removed, the single UI iteration bound still limits the operation of the DFE. Further, unrolled DFEs might experience data recovery latency and exponential scaling of circuit complexity and power consumption with respect to ISI. Larger data recovery latency slows down the timing recovery loop of the receiver, thereby affecting the receiver's ability to extract and effectively track the transmitter's clock phase and frequency. The slowed timing loop sacrifices some tolerance to jitter in the received signal, which directly affects BER. Thus, it is beneficial that a SERDES receiver recover the transmitted symbols as quickly as possible to enable a fast timing recovery loop.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments calibrate a sampling phase adjustment of a receiver. An analog-to-digital converter generates samples of a received signal at a sample phase. A phase detector selects a window of n samples. If the window includes a Nyquist pattern, a bang-bang trap is enabled. The bang-bang trap iteratively, for each transition between a first consecutive bit and a second consecutive bit in the Nyquist pattern, samples the received signal at a zero crossing between the first and second consecutive bits and determines the transition polarity. Based on the transition polarity and the zero crossing sample value, the bang-bang trap determines whether the sample phase is correct. If Nyquist patterns are absent from the window, a margin phase detector determines a target voltage margin value and a voltage of a cursor bit of the window. Based on the target voltage margin value and the voltage of the cursor bit, the margin phase detector determines whether the sample phase is correct.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee.

Other aspects, features, and advantages of embodiments of the present invention will become more fully apparent from the following detailed description, the appended claims, and the accompanying drawings in which like reference numerals identify similar or identical elements.

Figure 8:
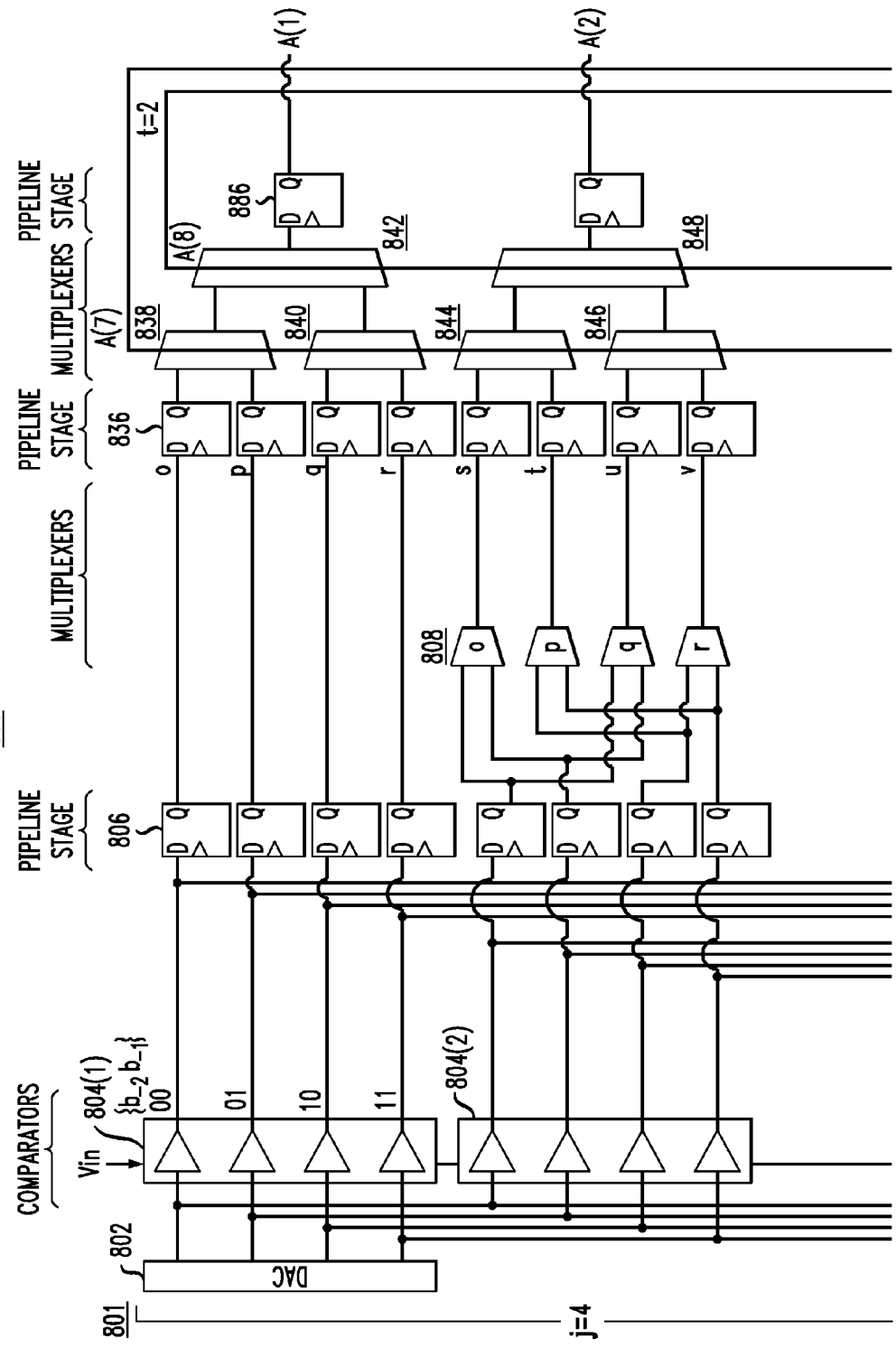
FIG. 8 shows a block diagram of a 2-tap interleaved and retimed predictive selection DFE in accordance with exemplary embodiments of the present invention.
Figure 8:
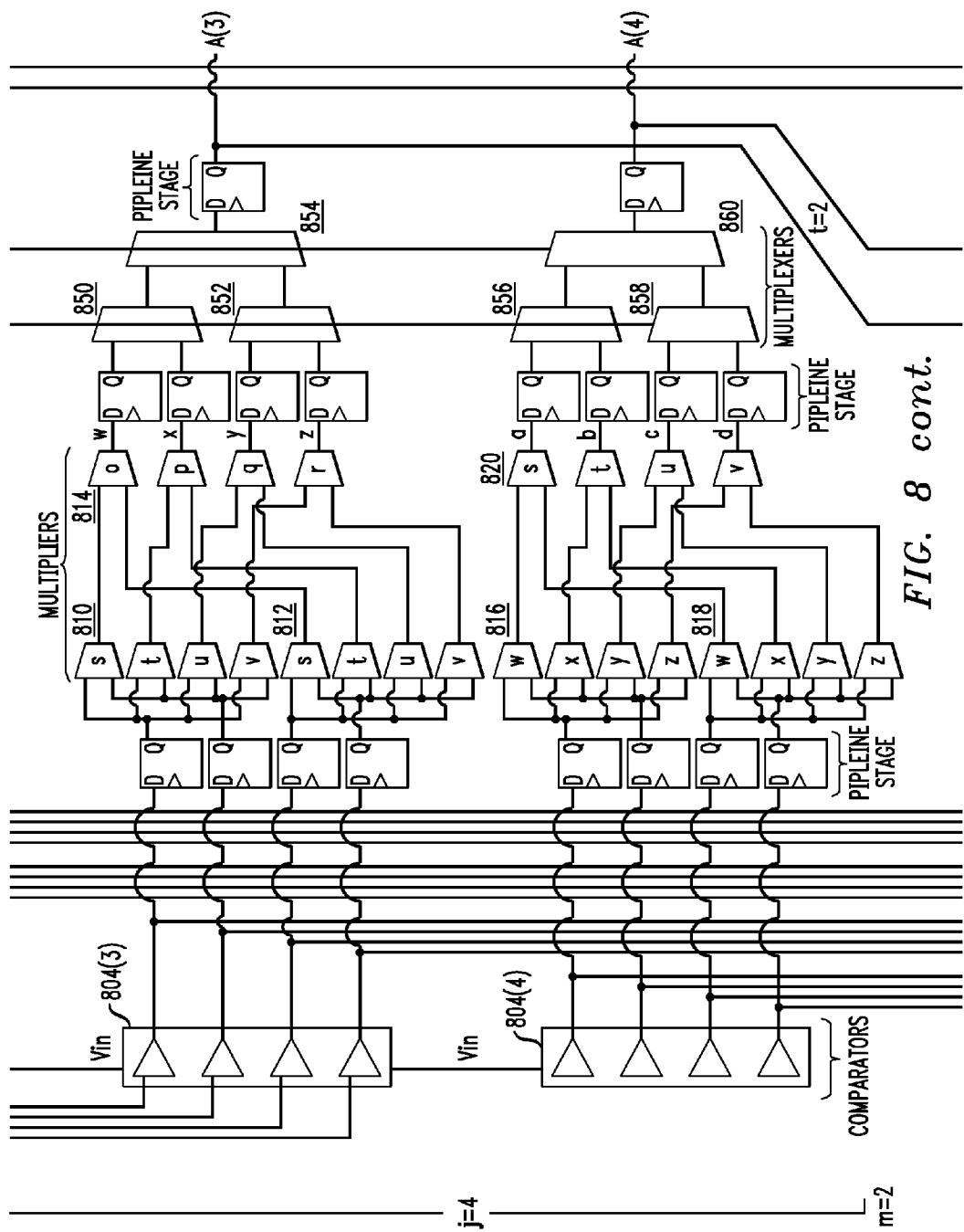
Figure 12:
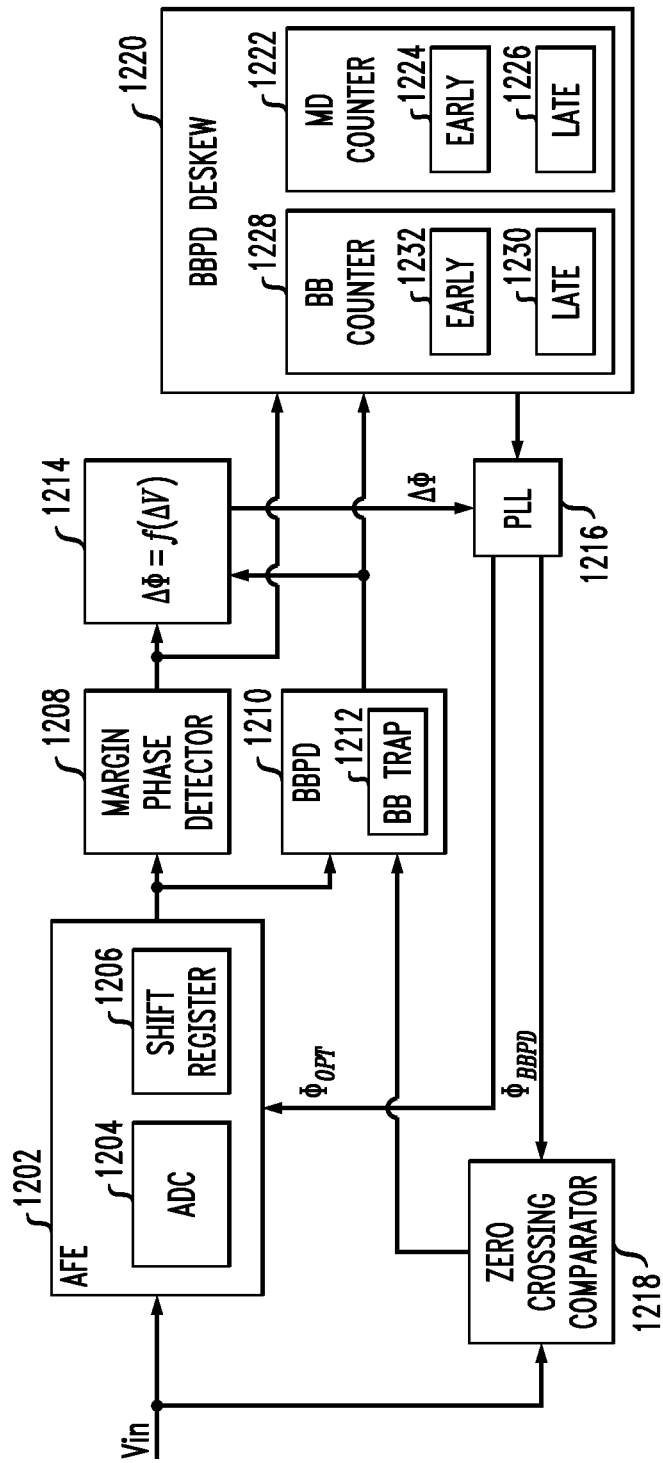
FIG. 12 shows a block diagram of a voltage margin phase detector and a bang-bang phase detector for timing recovery in accordance with exemplary embodiments of the present invention.
Figure 18:
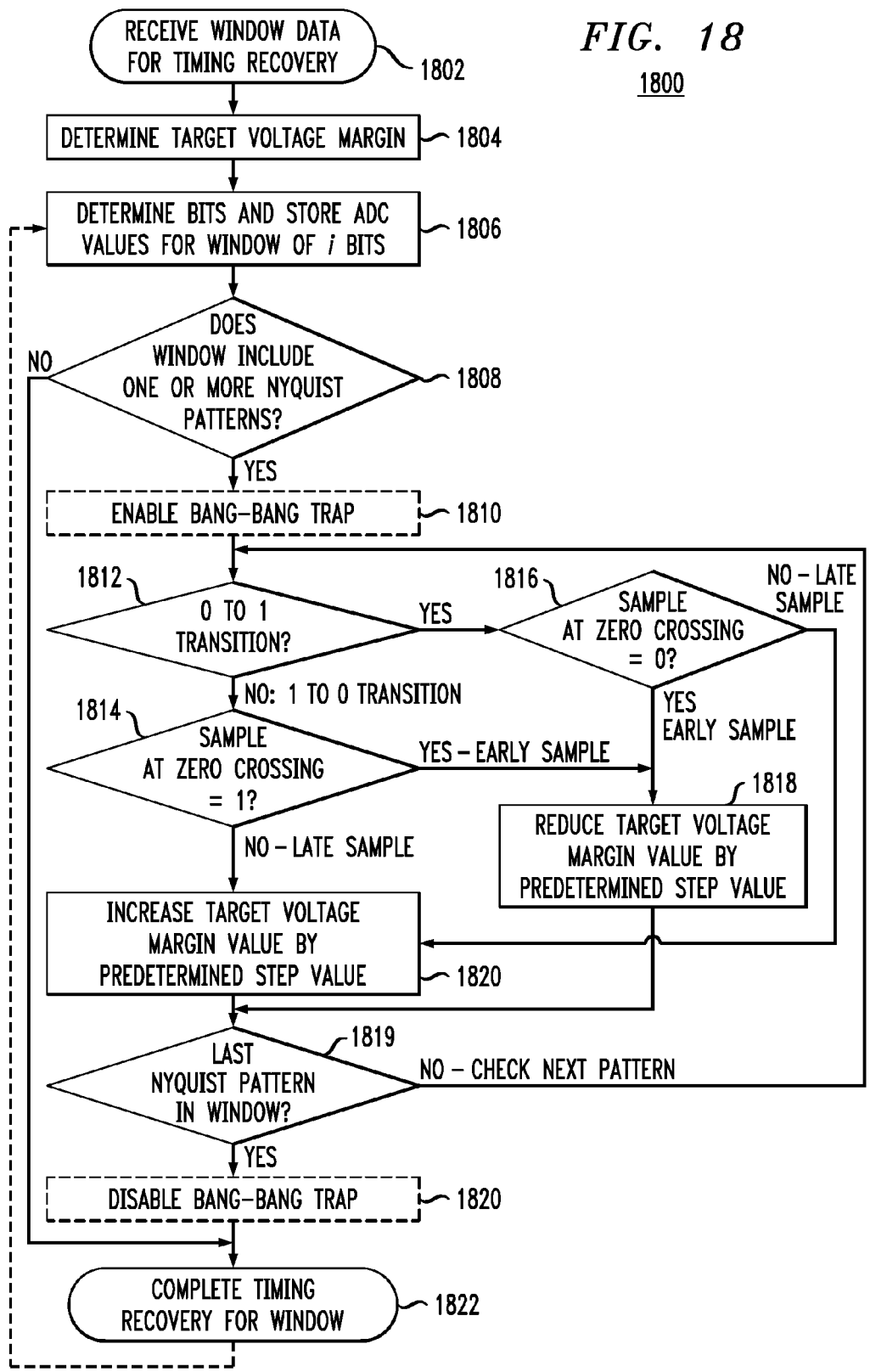
Figure 19:
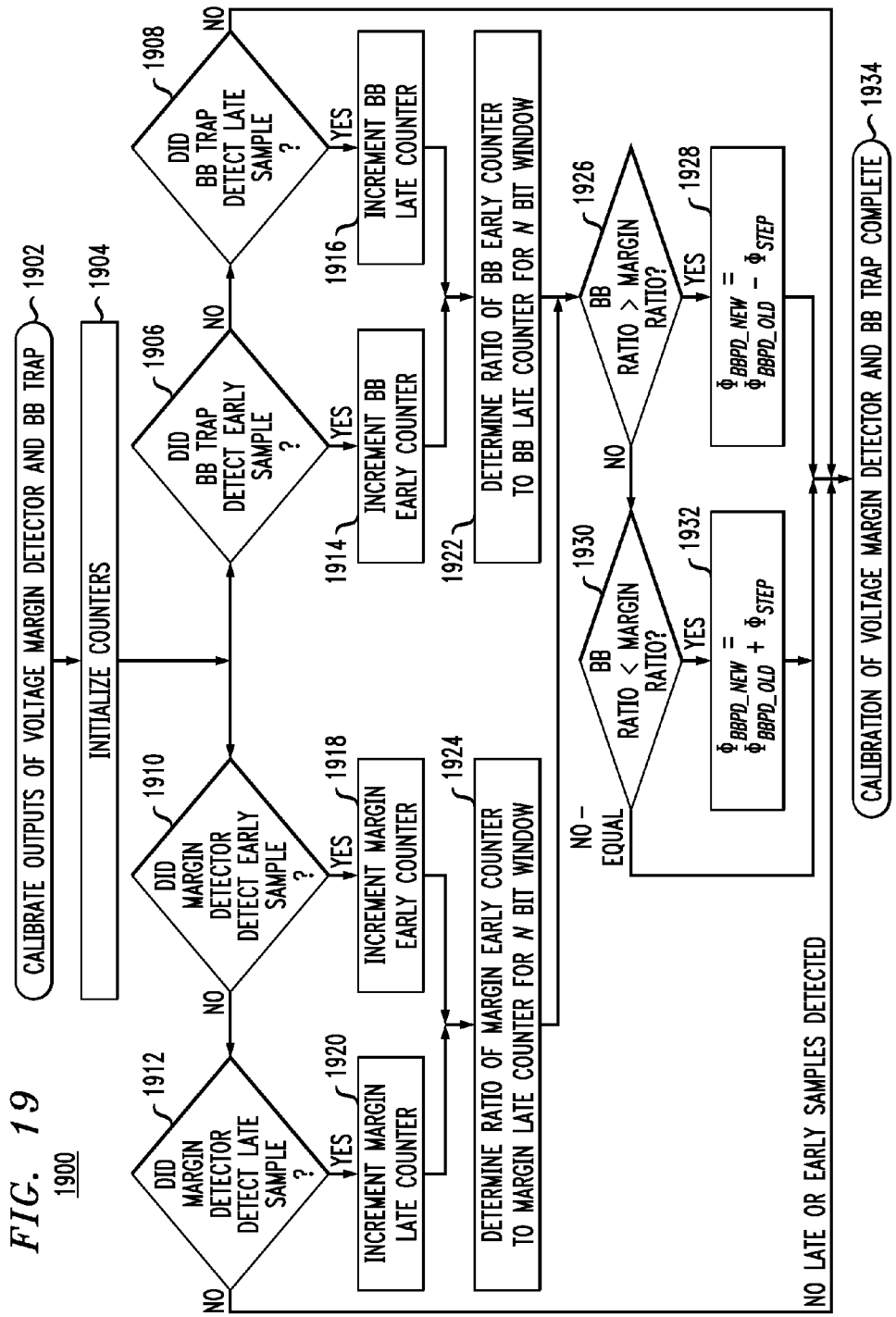
Figure 21:
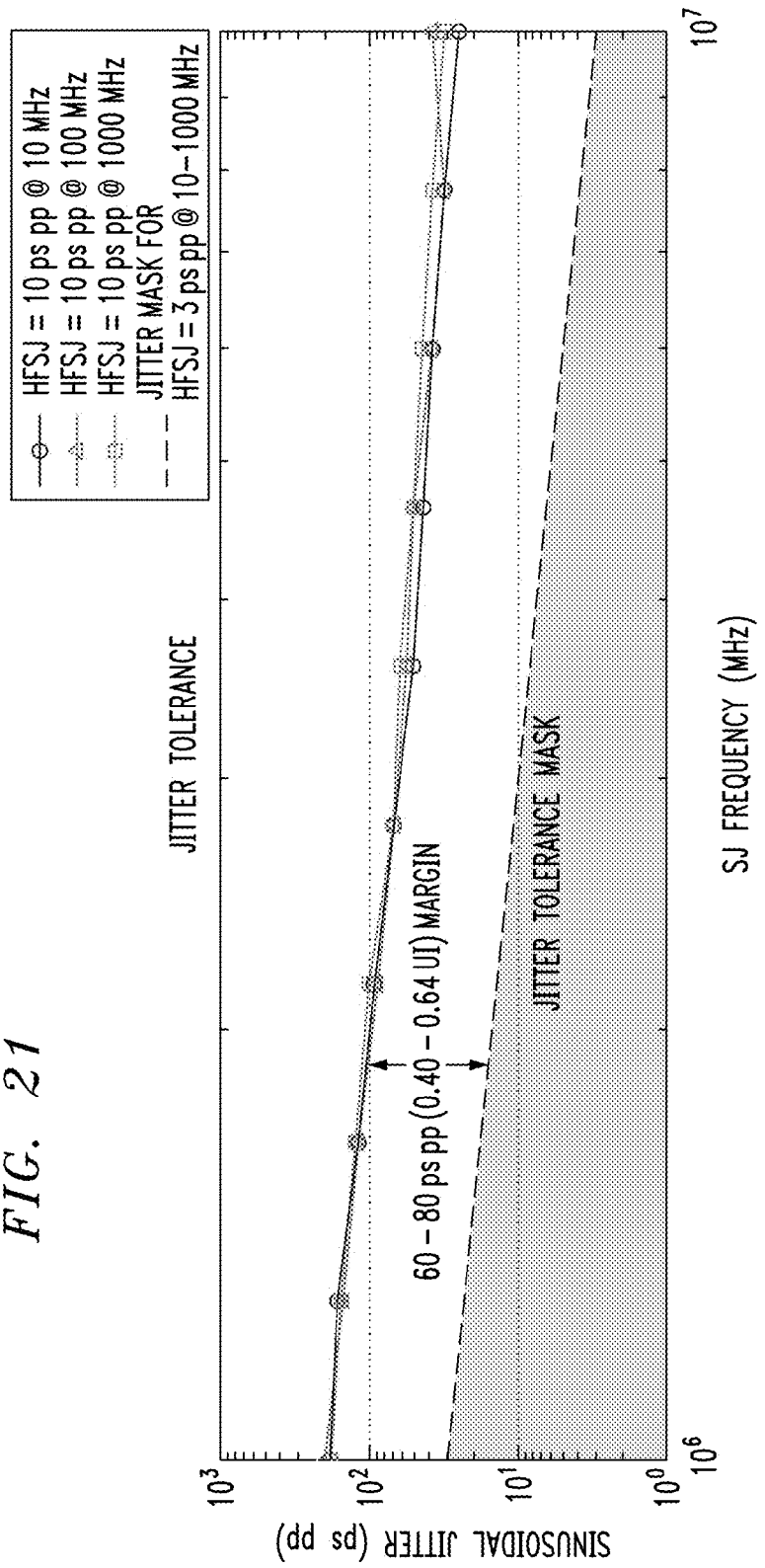
Figure 22:
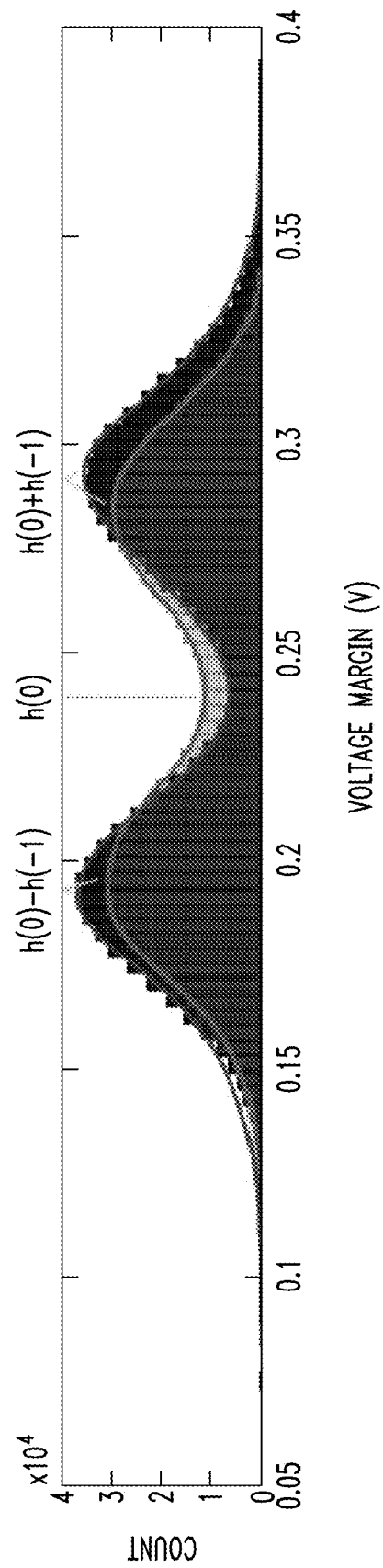
Figure 23:
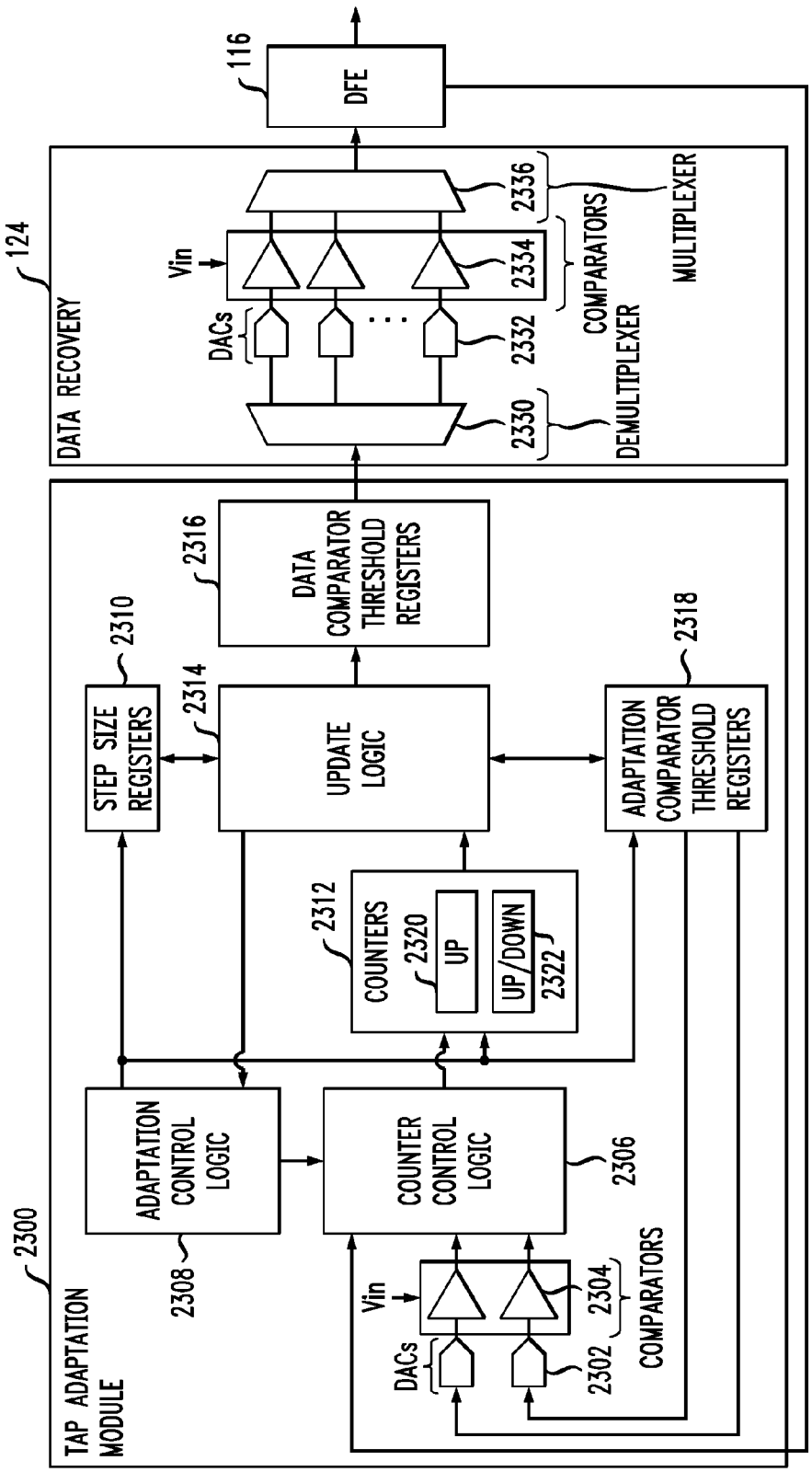

FIG. 17A shows an exemplary plot of phase jitter applied to the timing recovery circuit of FIG. 12, FIG. 17B shows an exemplary plot of actual voltage margin at a sample time of the timing recovery circuit of FIG. 12, FIG. 17C shows an exemplary plot of voltage margin of an ADC of the timing recovery circuit of FIG. 12, and FIG. 17D shows an exemplary plot of adjusted clock values of the timing recovery circuit of FIG. 12;

FIG. 18 shows a flow diagram of a Nyquist pattern timing recovery algorithm for a receiver employing the bang-bang detector of FIG. 12 in accordance with exemplary embodiments of the present invention;

FIG. 19 shows a flow diagram of a calibration algorithm for a receiver employing the bang-bang detector of FIG. 12 in accordance with exemplary embodiments of the present invention;

FIG. 20 shows an exemplary plot of phase lock of a receiver employing the bang-bang detector of FIG. 12 in accordance with exemplary embodiments of the present invention;

FIG. 21 shows an exemplary plot of jitter tolerance for a receiver employing the bang-bang detector of FIG. 12 in accordance with exemplary embodiments of the present invention;

FIG. 22 shows an exemplary histogram of voltage margin for a receiver employing the bang-bang detector of FIG. 12 in accordance with exemplary embodiments of the present invention;

FIG. 23 shows a block diagram of a DFE tap adaptation module in accordance with embodiments of the present invention; and FIG. 24 shows a flow diagram of a DFE tap adaptation algorithm for the interleaved and retimed predictive selection DFE of FIG. 8 in accordance with embodiments of the present invention.

DESCRIPTION

Described embodiments of the invention provide a mostly digital SERDES (MDS) receiver implemented in a low power architecture intended for short-reach and medium-reach channels. As described herein, a non-uniformly quantized comparator array front-end provides substantial power savings over a uniformly quantized comparator array. Digital techniques of interleaving, block processing, and predictive selection overcome the DFE iteration bound, meeting timing constraints in a standard cell implementation. Voltage margin-based timing recovery with Nyquist sequence detection simultaneously provide converging DFE tap adaptation and sampling phase adjustment for timing impairments.

Table 1 summarizes a list of acronyms employed throughout this specification as an aid to understanding the described embodiments of the invention:

TABLE 1

| SERDES | Serializer/Deserializer | IC | Integrated Circuit |
|---|---|---|---|
| FIR | Finite Impulse Response | AFE | Analog Front End |
| CDR | Clock and Data Recovery | DFE | Decision Feedback Equalizer |

TABLE 1-continued

| BER | Bit Error Rate | DAC | Digital to Analog Converter |
|---|---|---|---|
| ADC | Analog to Digital Converter | ISI | Intersymbol Interference |
| FFE | Feed Forward Equalizer | DBE | Digital Back End |
| UI | Unit Interval | RF | Radio Frequency |
| NRZ | Non-Return to Zero | ESA | Error Signature Analysis |
| PCIE | Peripheral Component Interconnect Express | PAM | Pulse Amplitude Modulation |
| PD | Phase Detector | BBPD | Bang-Bang Phase Detector |
| MDS | Mostly Digital SERDES | SJ | Sinusoidal Jitter |
| RJ | Random Jitter | | |

Figure 1:
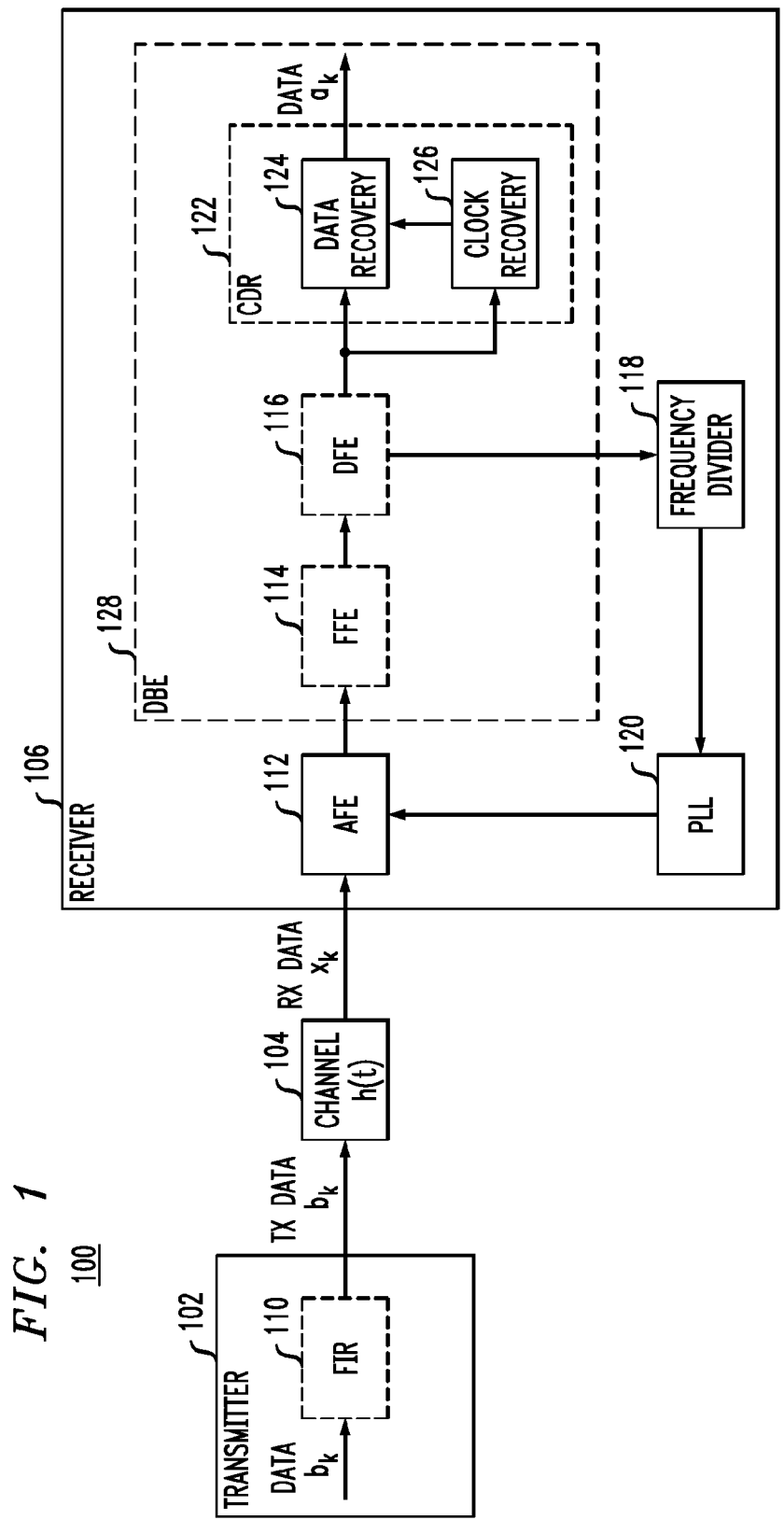
FIG. 1 shows an exemplary block diagram of a serializer-deserializer (SERDES) communication system.

FIG. 1 shows a block diagram of exemplary SERDES communication system 100. As shown in FIG. 1, SERDES system 100 includes transmitter 102, communication channel 104 and receiver 106. As shown, transmitter 102 might optionally include a finite impulse response filter for conditioning data before transmission to communication channel 104. Transmitter 102 provides a transmit signal as serial data bits, $b_k$, via communication channel 104, to receiver 106. Communication channel 104 might typically be a physical transmission medium, such as a backplane, drive head in a magnetic recording system, copper cables, or optical fibers. Although described herein as being employed in a serializer-deserializer (SERDES) communication system, embodiments of the present invention are not so limited, and some embodiments might be employed in alternative communications systems employing a transmitter and a receiver communicating over a communication channel. The communication channel might be at least one of fiber optics, one or more coaxial cables, one or more twisted pair copper wires, or one or more radio frequency (RF) channels. Additionally, various signal modulation and de-modulation techniques might be employed. Further, although described herein as each "bit" of a signal having a corresponding logic value, it is understood that the various signals described herein might employ multi-bit data symbols based on various data encoding schemes, such as pulse amplitude modulation (e.g., PAM-4). Further, signal amplitudes might be expressed herein as −1 to 1 such as for Non-Return to Zero (NRZ) signaling, although any signal encoding scheme might be employed.

After passing though communication channel 104, the analog transmit signal might be filtered or equalized by analog front end (AFE) 112 of receiver 106. AFE 112 might comprise a continuous time analog filter. The output of AFE 112 might be provided to at least one of optional feed forward equalizer (FFE) 114 and optional decision feedback equalizer (DFE) 116. FFE 114 might optionally be employed to reduce precursor ISI. DFE 116 generates equalized output based on one or more previous data decisions and pulse response coefficients (taps) corresponding to communication channel 104. DFE 116 might provide a control signal to frequency divider 118 and PLL 120 to adjust the operation of AFE 112. DFE 116 also provides an equalized output signal to clock and data recovery (CDR) circuit 122 to sample the equalized signal.

As shown, CDR 122 includes data recovery module 124 and clock recovery module 126. Clock recovery module 126 adjusts the phase and frequency of the digital clock for sampling the received analog waveform to allow proper data detection. For example, the phase of the received analog waveform is typically unknown and there might be a frequency offset between the frequency at which the original data was transmitted and the receiver sampling clock frequency. Clock recovery module 126 provides sampling clock data to data recovery module 124. Data sampled by data recovery module 124 is provided as output data $a_k$, which might typically be provided to subsequent modules (not shown) of receiver 106 for further processing.

Figure 2:
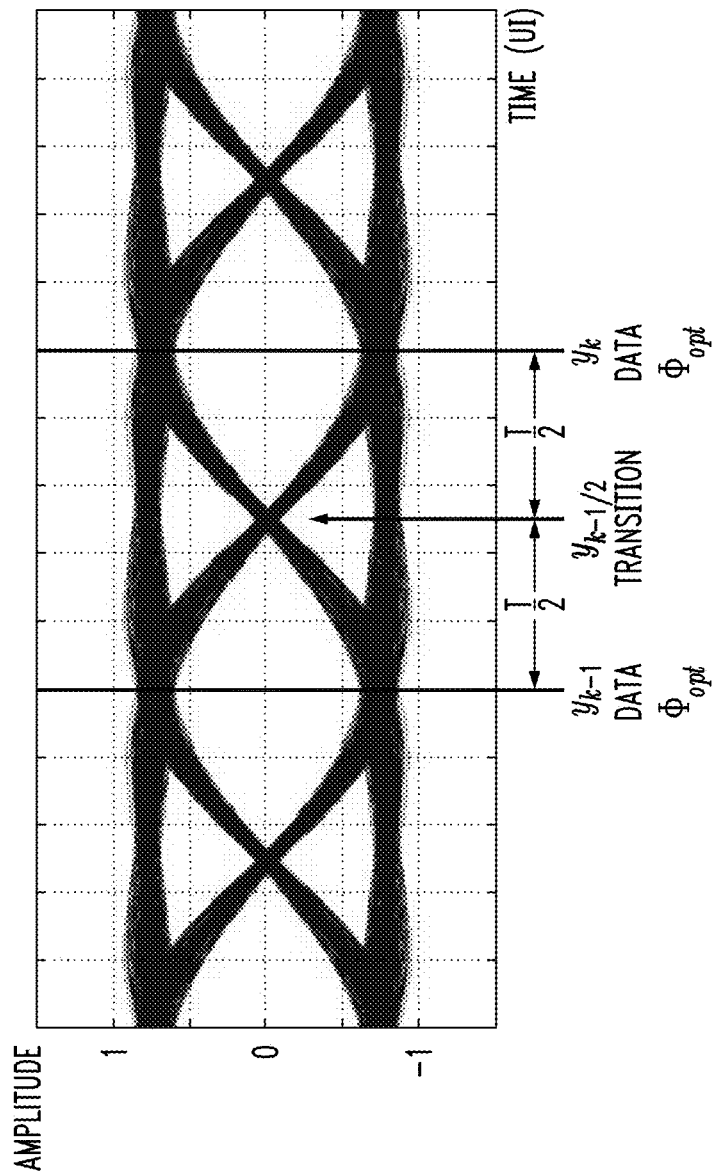
FIG. 2 shows an exemplary eye diagram of the receiver of the SERDES system of FIG. 1.

FIG. 2 shows a plot of exemplary data eye 200 of receiver 106. Data eye 200 illustrates super-positions of many data eyes of signal transitions expressed in amplitude versus time in UI. The data eye is created as received signals transition from low to low, low to high, high to low and high to high. Transitions from low to high and high to low might also be termed a transition or crossing point. CDR 122 detects timing of the received data stream and uses the detected timing to correct the frequency and phase of a local clock for sampling the received data. As shown in FIG. 2, for baud-rate CDR circuits, the received signal is sampled once every UI ($y_{k-1}$ and $y_k$). Alternatively, for over-clocked circuits, such as bang-bang CDR circuits, the received signal is sampled twice every UI, one sample at a crossing point ($y_{k-1/2}$) and another sample at the center of the data eye ($y_k$). Two consecutive data samples, ($y_{k-1}$ and $y_k$), and a crossing sample between them, ($y_{k-1/2}$), might then be used to decide whether the current sampling phase is lagging or leading the ideal sampling point.

Figure 3A:
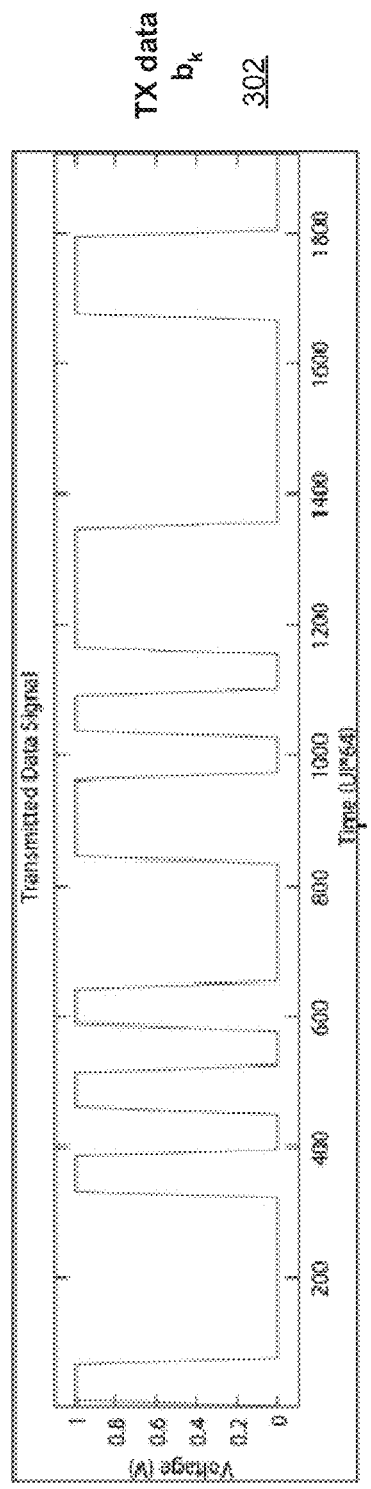
FIG. 3A shows an exemplary transmit data signal of the transmitter of the SERDES system of FIG. 1.
Figure 3B:
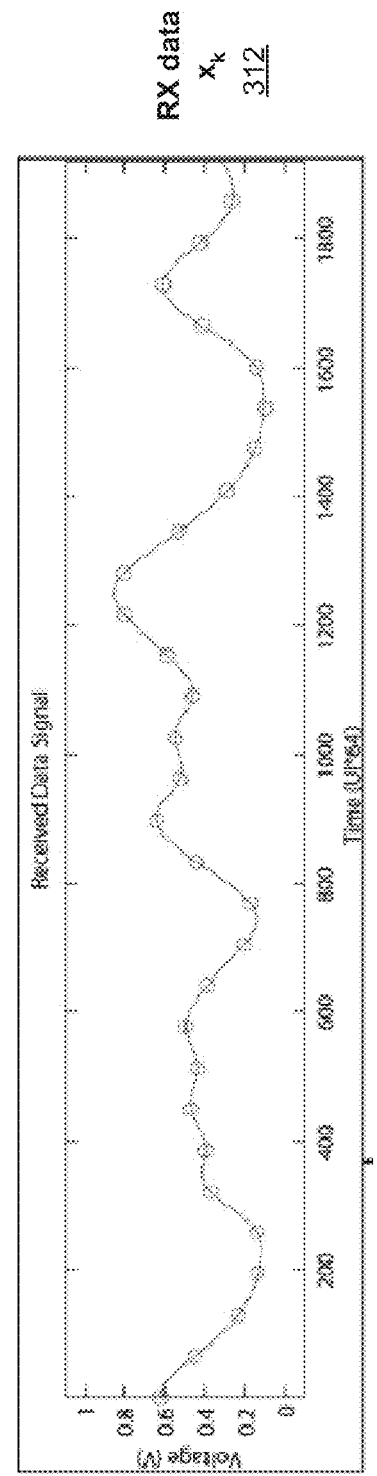
FIG. 3B shows an exemplary receive data signal of the receiver of the SERDES system of FIG. 1.

Due to the channel pulse response, h(t), of communication channel 104, the transmitted signal bits, $b_k$, are received by receiver 106 as receive data bits $x_k$. FIG. 3A shows a plot of exemplary transmitted data signal, $b_k$ 302, voltage versus time in unit intervals (UI), where a UI corresponds to a symbol period. FIG. 3B shows a plot of received data signal, $x_k$ 312, corresponding to transmitted signal $b_k$ 302 for an exemplary communication channel 104. As shown in FIGS. 3A and 3B, received data signal $x_k$ 312 might not be identical to transmitted data signal $b_k$ 302, for example due to intersymbol interference (ISI) based on the pulse response h(t) of communication channel 104.

Figure 4:
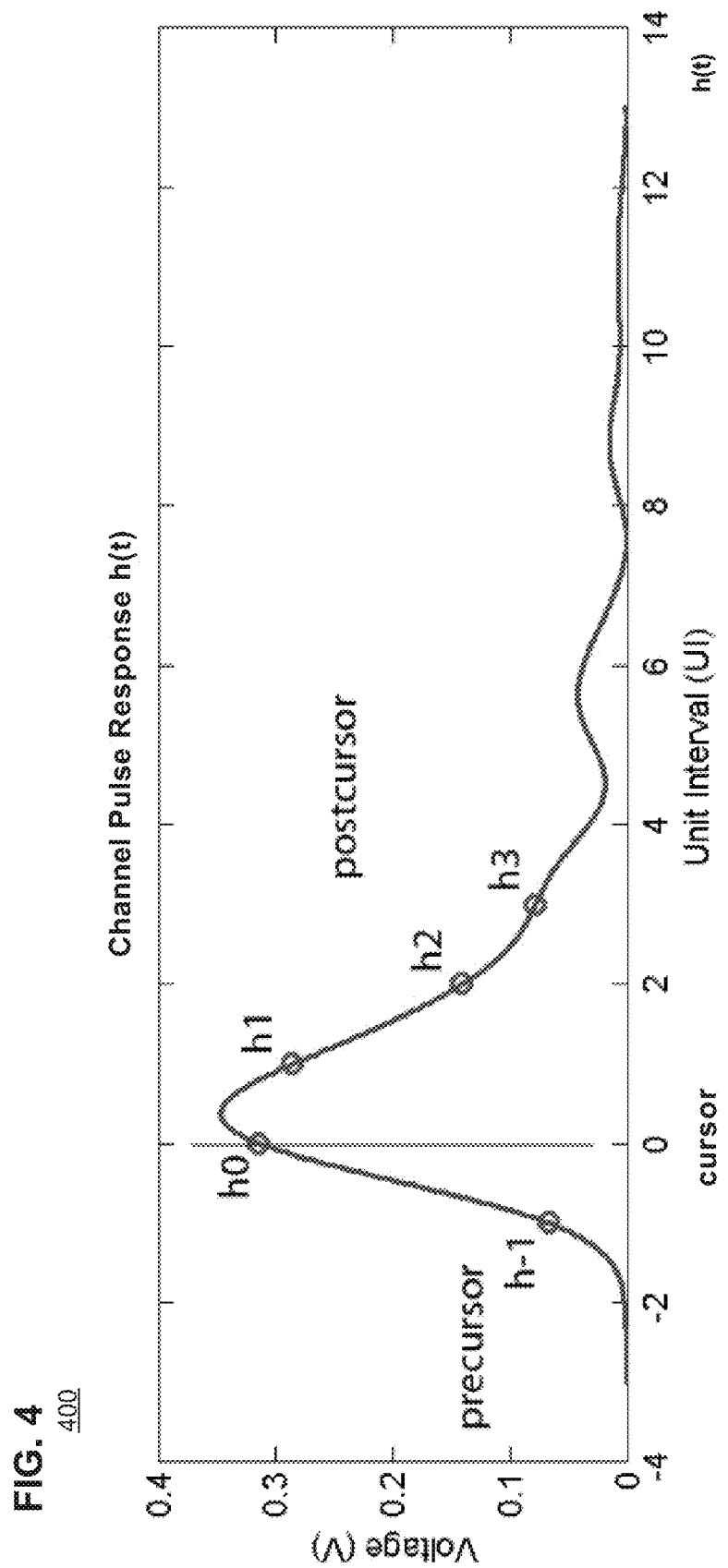
FIG. 4 shows an exemplary plot of the pulse response of the communication channel of the SERDES system of FIG. 1.

FIG. 4 shows an exemplary plot 400 of the voltage over time of channel pulse response h(t) of communication channel 104 at receiver 106. Channel pulse response h(t) is the result of transmitting an approximately rectangular pulse (with finite rise and fall times and neglecting pre-emphasis) from transmitter 102. As shown in FIG. 4, each data pulse transmitted over communication channel 104 generates pulse response h(t) received at receiver 106, pulse response h(t) includes a pre-cursor ISI component ($h_{-1}$) in the UI before the pulse, the cursor component ($h_0$) at the UI of the pulse, and one or more post-cursor ISI components ($h_1$, $h_2$, $h_3$) at UIs following the pulse. As multiple pulses are transmitted over communication channel 104 at high data rates (e.g., the exemplary transmitted data signal $b_k$ of FIG. 3A), the overlapping in time of received symbols leads to ISI between each pulse as ISI contributions from previous symbols can add or subtract from the voltage amplitude of the current symbol (e.g., the exemplary received data signal $x_k$ of FIG. 3B). DFE 116 subtracts the sum of the ISI contributions for a predetermined number of previously received symbols from the received signal by multiplying the previously received symbol values with their corresponding pulse response coefficients (taps) summing the products, and subtracting them from the received signal.

Figure 5:
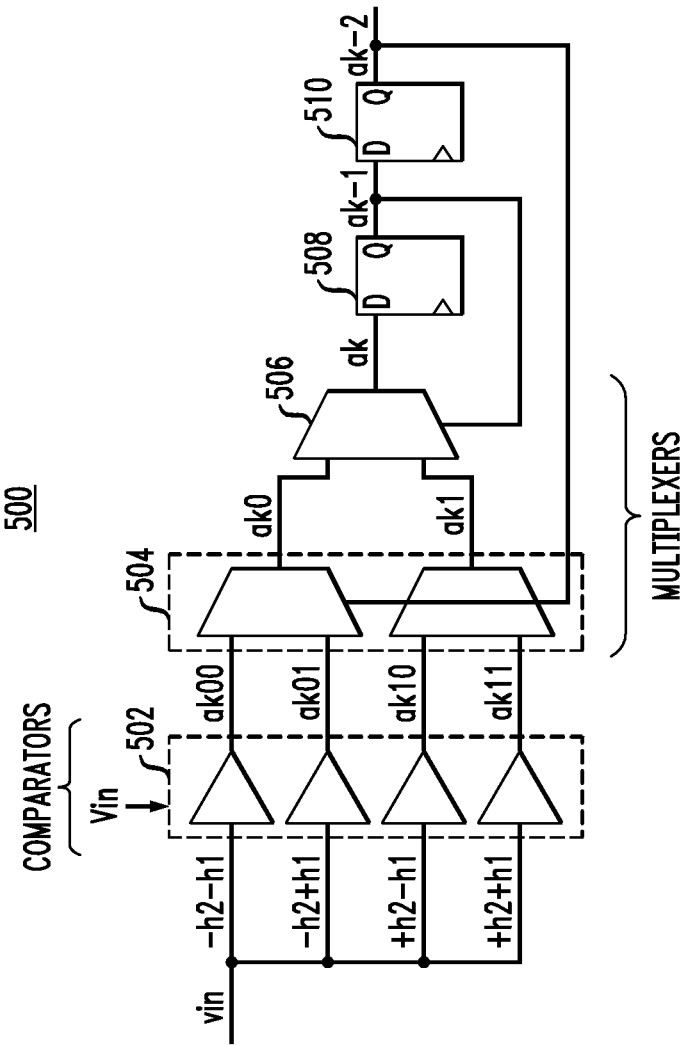
FIG. 5 shows an exemplary block diagram of a 2-tap fully unrolled decision feedback equalizer (DFE) of the SERDES system of FIG. 1.

FIG. 5 shows a block diagram of exemplary 2-tap fully unrolled DFE 500. As shown in FIG. 5, fully unrolled DFE 500 does not have a feedback path between the analog and digital domains and, thus, the 1 UI iteration bound is alleviated. DFE 500 precomputes the possible ISI contributions based on the received symbol history, and the precomputed values are used as the voltage thresholds of the comparators in comparator array 502. Since DFE 500 is a 2-tap DFE, the possible symbol histories ($b_{-2}b_{-1}$) might be (00), (01), (10)

and (11), corresponding to ISI contributions $-h_2-h_1$, $-h_2+h_1$, $+h_2-h_1$, and $+h_2+h_1$, respectively. Multiplexers 504 and 506 select the appropriate comparator 502 during a given UI. Latches 508 and 510 are used to store prior bits corresponding to each tap (e.g., $b_{-2}b_{-1}$). Although the AFE-DBE feedback path is eliminated by DFE 500, a 1 UI iteration bound still exists in the DBE. Although shown as a 2-tap DFE, any number of taps could be similarly implemented. For example, adding one more tap will double the number of possible symbol histories (e.g., 2 taps, $2^2=4$ to 3 taps $2^3=8$), thereby doubling the number of comparators and multiplexers of DFE 500. Thus, fully unrolled DFE 500, although advantageous for short- or medium-reach channels needing up to approximately 6-7 taps, is not well suited for long-reach or high-impairment channels due to this exponential scaling property.

To further alleviate the 1 UI iteration bound, several digital circuit techniques might be applied, including (1) interleaving, (2) block processing (retiming), and (3) predictive selection of multiplexers. For example, duplicating and interleaving a circuit j times enables each duplicate, or interleave, to operate with frequency that is 1/jth of the original circuit. However, interleaving alleviates the 1 UI timing constraint only for circuits without feedback. Thus, in a DFE might beneficially employ both interleaving and block processing (retiming) together.

Figure 6:
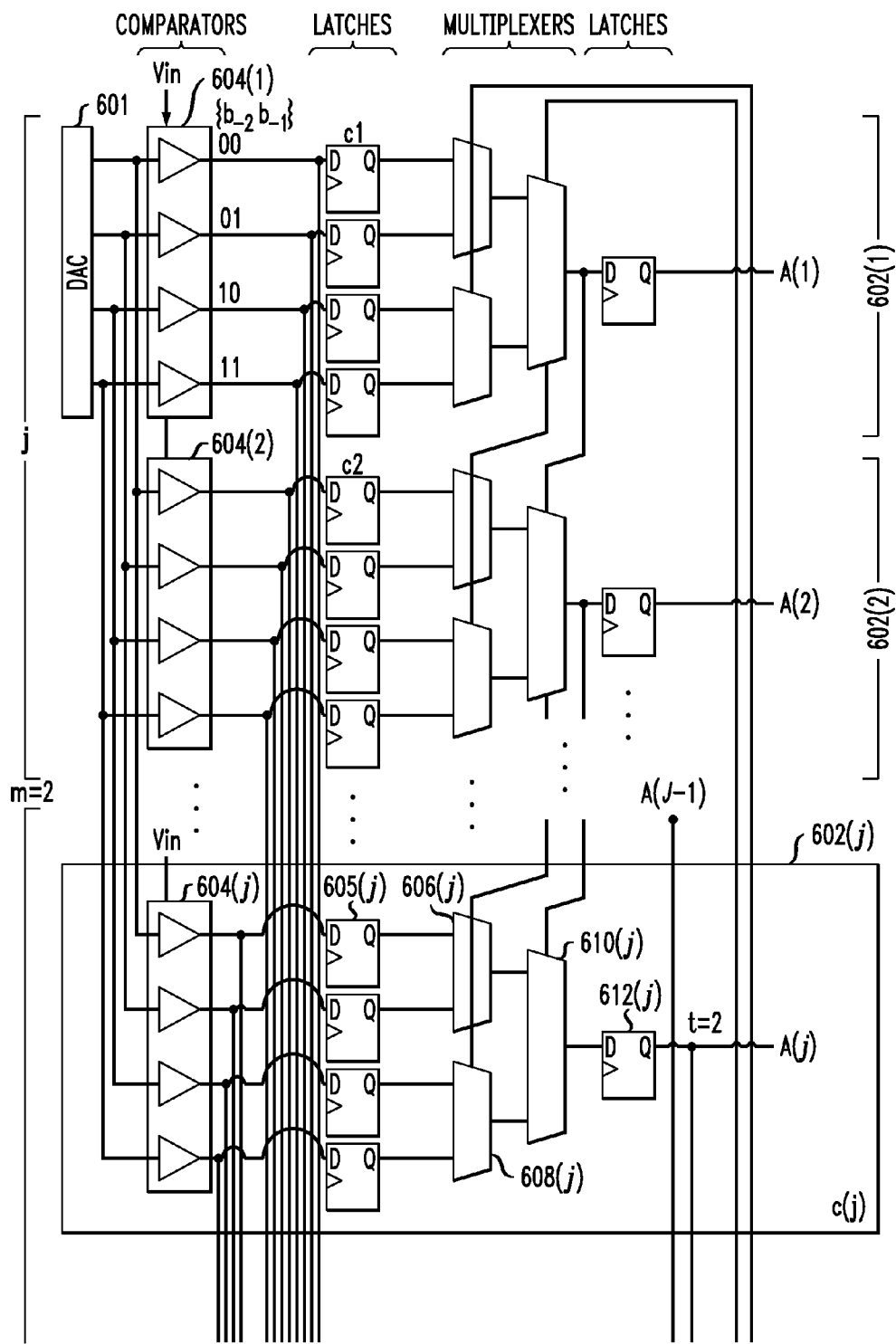
FIG. 6 shows an exemplary block diagram of a 2-tap interleaved and retimed DFE.
Figure 6:
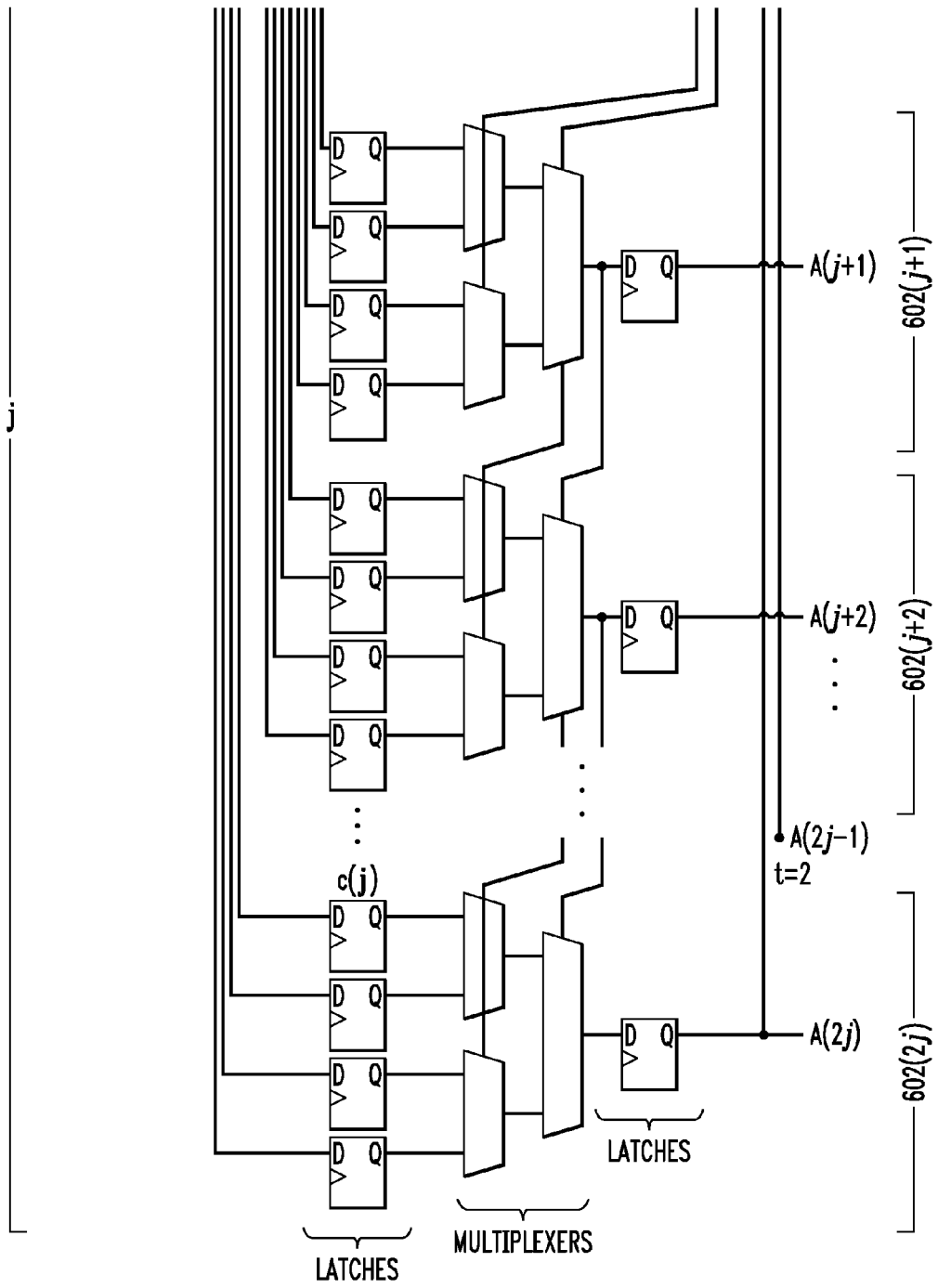

FIG. 6 shows the 2-tap DFE of FIG. 5 with 2j interleaves, shown as interleaves 602(1)-602(2j). Each interleave 602(1)-602(2j) provides a corresponding output, shown as outputs A(1) through A(j). As shown, each interleave might include a comparator array, 604, in an ADC of the receiver. In some embodiments, one or more interleaves might share a given comparator array 604, such as shown in FIG. 6, where interleave 602(1) and 602(j+1) share comparator array 604(1), interleave 602(2) and 602(j+2) share comparator array 604(2), and so on. The two (e.g., m=2) retiming blocks shown in FIG. 6 each contain j interleaves. The number of interleaved comparator arrays is independent of the number of circuit interleaves (2j), and might be chosen based on comparator timing constraints (e.g., regeneration time). Each comparator in arrays 604 receives Vin (e.g., the signal received by receiver 106). DAC 601 provides a comparator threshold voltage to each individual comparator within each of comparator arrays 604. For example, as shown in FIG. 6, DAC 601 might provide threshold voltages to each comparator corresponding to every possible combination of bit history $\{b_{-2}b_{-1}\}$. The output threshold voltages provided by DAC 601 might be controlled by register values or a microprocessor of receiver 106. Together, DAC 601 and each comparator arrays 604 form a non-uniformly quantized ADC, as described herein. Each interleave 602(1)-602(2j) is clocked with a 1/jth rate clock with respect to the data rate clock. In some embodiments, each clock might be shifted by 2T/j with respect to the clock of its immediately preceding interleave. For example, the first interleave processes bit A1 on clock c1, the second interleave processes bit A2 on clock c2=c1-T/4, and so on.

Figure 7:
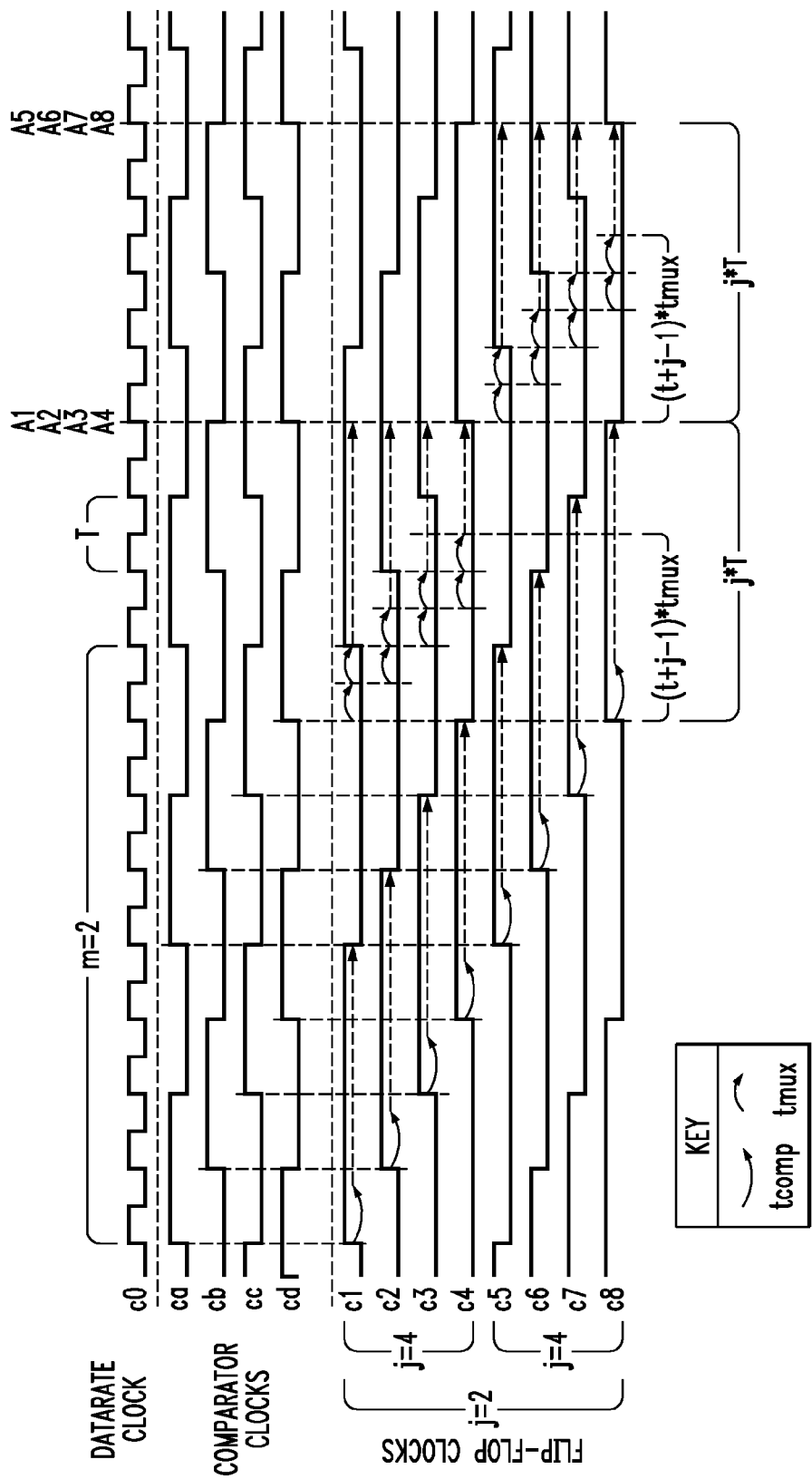
FIG. 7 shows an exemplary timing diagram of the interleaved and retimed DFE of FIG. 6.

In a retimed DFE, such as shown in FIG. 6, the j interleaves are grouped into m groups of interleaves. In the exemplary DFE of FIG. 6, m=2 groups of j interleaves. The clock edges on which data is passed between the two groups of interleaves are "retimed" such as shown in the exemplary timing diagram shown in FIG. 7. As shown in FIG. 7, the outputs A1 to A(j) from the top interleave block are retimed to the common clock c(j) and the bottom outputs A(j+1) to A(2j) are retimed to the common clock c(j). This retiming extends the timing window of the feedback path according to Equation 1:

$$t_{cq}+t_{mux}(j+t-1)+t_{su} \leq jT \quad (1)$$

In Equation 1, t is the number of taps, $t_{cq}$ and $t_{su}$ are the clock-to-q and setup time delays of latches 605 and 612, $t_{mux}$ is the multiplexer delay of multiplexers 606, 608 and 610, and T is one UI, e.g. one data rate bit period. Based on Equation 1, it can be shown that for $t_{mux}<T$, increasing j (e.g., the number of interleaves) will relax the timing constraint further.

As data rates increase, the reduction in the unit interval, T, accelerates at a faster rate than the reduction in the multiplexer delay, $t_{mux}$, arising from process node scaling. Consequently, the timing constraint of Equation 1 yields diminishing returns as the number of interleaves, j, is increased. Solving Equation 1 for j, it can be seen that the number of clock domains, 2j, depends on the relative size between the data rate clock period, T, and the multiplexer delay, $t_{mux}$, as shown in Equation 2:

$$2\left(\frac{t_{cq}+(t-1)t_{max}+t_{su}}{T-t_{max}}\right) \leq 2j \quad (2)$$

As an example, in a system with a 6 Gbps NRZ, 65 nm cell gates, 4-tap DFE with nominal standard-cell delays of $t_{mux}=60$ ps, $t_{cq}=120$ ps, and $t_{su}=60$ ps. With $T=1/(6$ Gbps$)\approx170$ ps, this yields Equation (2) to yield an unrolled DFE with only 2j=8 clock domains. However, if the data rate is doubled to 12 Gbps, T becomes 84 ps, leading to Equation (2) yielding 2j=50, thus requiring more than double the number of DFE taps to achieve an equivalent Bit Error Ratio (BER) using the same channel.

While technology node scaling is beneficial, it may not always be available as a means to reduce the number of clock domains; therefore, an architectural improvement is desired. In the DFE shown in FIG. 6, the comparator selection is through a worst-case path of (j+t−1) multiplexers. This timing path is reduced to include only t multiplexers by pre-computing the inputs of the multiplexers based on predictive multiplexer selection. Predictive multiplexer selection conditions the multiplexer data inputs based on the multiplexer select inputs coming from the other group of j interleaves. FIG. 8 shows an exemplary 2-tap DFE with predictive selection.

FIG. 8 shows an exemplary schematic of predictive selection DFE 800 having 2-taps (t=2), two interleave timing blocks (m=2), and four interleaves in each interleave timing block (j=4), although embodiments of the invention are not so limited and any number of taps, timing blocks and interleaves might be employed. Further, for simplicity, ADC values are shown as 2 bit values, although ADC values of other numbers of bits might be employed. As shown in FIG. 8, an input signal voltage, Vin, is received by each comparator in comparator arrays 804(1)-804(4). Each comparator in each array is provided a threshold voltage from digital to analog converter (DAC) 802. DAC 802 provides a comparator threshold voltage to each individual comparator within each of comparator arrays 804. For example, as shown in FIG. 8, DAC 802 might provide threshold voltages to each comparator corresponding to every possible combination of bit history $\{b_{-2}b_{-1}\}$. The output threshold voltages provided by DAC 802 might be controlled by register values or a microprocessor of receiver 106, for example, the inputs to DAC 802 might be digital words provided from a memory or control signal of the receiver to generate the corresponding variable analog threshold voltages for each comparator. Together, DAC 802 and each comparator arrays 804 form a non-uniformly quantized ADC, as described herein. Although shown as sharing the comparator arrays between the two interleave blocks 801 and 803, each interleave block 801 and 803 might alternatively include separate comparator arrays. Further, for simplicity, pipeline latches, are not individually numbered, and are rather numbered generally as pipeline stages 806, 836 and 886 since the purpose of each latch is to provide storage for a corresponding bit for a bit period in pipeline stages while predictive DFE 800 is processing bits.

As shown in FIG. 8, DFE 800 includes two interleave blocks (e.g., m=2), each including 4 interleaves (e.g., k=j=4 for each interleave). The added parameter, k, is the number of predictive selection multiplexer stages (e.g., multiplexers 808-834 in the feedback path). The timing constraints of DFE 800 are given by Equations (3) and (4):

$$tcq+(k-1)tmux+tsu \leq nT \quad (3)$$

$$tcq+(t)tmux+tsu \leq jT \quad (4)$$

where n is desirably kept as small as possible to minimize system latency. If Equation (3) cannot be satisfied with n≤2j, additional pipeline stages might be added. The advantage of predictive selection, of course, is that the number of clock domains, 2j, no longer depends on the relative size between the unit interval, T, and the multiplexer delay, tmux, as shown by solving Equation 4 for j:

$$2\left(\frac{t_{cq} + (t)t_{max} + t_{su}}{T}\right) \leq 2j \quad (5)$$

As shown in FIG. 8, each output bit of each interleave is labeled with a corresponding letter. For example, the output bits of the first interleave are labeled {o,p,q,r}, the output bits of the second interleave are labeled {s,t,u,v}, the output of the third interleave are labeled {w,x,y,z}, and the output of the fourth interleave are labeled {a,b,c,d}. As shown in FIG. 8, each of multiplexers 808, 810, 812, 814, 816, 818 and 820 employ a corresponding one of the bits from a prior interleave as the select line for the multiplexer. For example, multiplexer 808 selects a given bit history based on the {o,p,q,r} outputs of the first interleave to generate {s,t,u,v}. Multiplexers 810 and 812 each employ the {s,t,u,v} outputs of the second interleave, and multiplexer 814 employs the {o,p,q,r} outputs of the first interleave to generate {w,x,y,z}. Similarly, multiplexers 816 and 818 each employ the {w,x,y,z} outputs of the third interleave, and multiplexer 820 employs the {s,t,u,v} outputs of the second interleave to generate {a,b,c,d}.

Since exemplary predictive selection DFE 800 is a 2-tap DFE (e.g., t=2), the output of each interleave is selected based on 2 prior bits. As shown, to generate conditioned output bits A(1)-A(8), DFE 800 employs bits A(3) and A(4) as the select lines for the output multiplexers corresponding to bits A(5)-A(8), and employs bits A(7) and A(8) as the select lines for the output multiplexers corresponding to bits A(1)-A(4). For example, multiplexers 838, 840 and 842 select one of {o,p,q,r}, based on prior output bits A(7) and A(8), as the A(1) conditioned output value for a subsequent window of n bit decisions for the first interleave. Multiplexers 844, 846 and 848 select one of {s,t,u,v}, based on prior output bits A(7) and A(8), as the A(2) conditioned output value for a subsequent window of n bit decisions for the first interleave. Multiplexers 850, 852 and 854 select one of {w,x,y,z}, based on prior output bits A(7) and A(8), as the A(3) conditioned output value for a subsequent window of n bit decisions for the first interleave. Multiplexers 856, 858 and 860 select one of {a,b,c,d}, based on prior output bits A(7) and A(8), as the A(4) conditioned output value for a subsequent window of n bit decisions for the first interleave.

As shown in FIG. 8, the first interleave determines the possible values of output bit A(1), shown as {o,p,q,r}, based on all four possible bit histories for bit A(1) in 2-tap DFE. The appropriate bit history is thus precomputed and might then be predictively selected, corresponding to the four possible bit histories (A7, A8) {00, 01, 10, 11}. For example, if (A7, A8)=(0,0), the bit history is (0,0), and {o} is the selected output of the first interleave, since {o} corresponds to a bit history of (0,0). If (A7,A8)=(0,1), the bit history is (0,1), and {p} is the selected output of the first interleave, since {p} corresponds to a bit history of (0,1). If (A7,A8)=(1,0), the bit history is (1,0), and {q} is the selected output of the first interleave, since {q} corresponds to a bit history of (1,0). Lastly, if (A7,A8)=(1,1), the bit history is (1,1), and {r} is the selected output of the first interleave, since {r} corresponds to a bit history of (1,1).

The second interleave determines output bit A(2) corresponding to the possible bit histories (A8, {o,p,q,r}). Thus, the output of the second interleave depends on the four possible outputs of the first interleave. Thus, multiplexer stage 808 selects an output based on {o,p,q,r} of the first interleave. As shown, multiplexer 808(o) selects between a bit history of (0,0) and a bit history of (0,1), since, for {o} to have been selected, A8 must have been 0. Multiplexer 808(p) selects between a bit history of (1,0) and (1,1), since, for {p} to have been selected, A8 must have been 1. Similarly, multiplexer 808(q) selects between a bit history of (0,0) and a bit history of (0,1), since, for {q} to have been selected, A8 must have been 0. Multiplexer 808(r) selects between a bit history of (1,0) and (1,1), since, for {r} to have been selected, A8 must have been 1.

The third interleave determines output bit A(3) corresponding to the possible bit histories ({o,p,q,r}, {s,t,u,v}). Thus, the output of the third interleave depends on the four possible outputs of the first interleave and the four possible outputs of the second interleave. Thus, multiplexer stages 810 and 812 select an output based on {s,t,u,v} of the second interleave, and multiplexer stage 814 selects an output based on {o,p,q,r} of the first interleave. As shown, multiplexers 810(s) and 812(s) select between a bit history of (0,0) and (0,1) for (A8,o), since for {s} to be selected, {o} must have been selected, which means A(7) and A(8) correspond to (0,0), and {o} can be either 0, which corresponds to multiplexer 810(s), or 1, which corresponds to multiplexer 812(s). Multiplexers 810(p) and 812(p) select between a bit history of (1,0) and (1,1) for (A8,p), since for {t} to be selected, {p} must have been selected, which means A(7) and A(8) correspond to (1,0) and (1,1), and {p} can be either 0, which corresponds to multiplexer 810(p), or 1, which corresponds to multiplexer 812(p). Multiplexers 810(u) and 812(u) select between a bit history of (0,0) and (0,1) for (A8,q), since for {u} to be selected, {q} must have been selected, which means A(7) and A(8) correspond to (0,0), and {q} can be either 0, which corresponds to multiplexer 810(q), or 1, which corresponds to multiplexer 812(q). Multiplexers 810(v) and 812(v) select between a bit history of (1,0) and (1,1) for (A8,r), since for {v} to be selected, {r} must have been selected, which means A(7) and A(8) correspond to (1,0) and (1,1), and {r} can be either 0, which corresponds to multiplexer 810(v), or 1, which corresponds to multiplexer 812(v). Multiplexer 814(o) the selects between the bit histories of 810(s) and 812(s) based on {o,p,q,r}. Multiplexer 814(p) the selects between the bit histories of 810(t) and 812(t) based on {o,p,q,r}. Multiplexer 814(*q*) the selects between the bit histories of 810(*u*) and 812(*u*) based on {o,p,q,r}. Multiplexer 814(*r*) the selects between the bit histories of 810(*v*) and 812(*v*) based on {o,p,q,r}.

The fourth (and any subsequent interleaves) function substantially the same as the third interleave, with the multiplexer select lines moving to the next two (or number of taps) interleaves. For example, as shown in FIG. 8, the fourth interleave determines output bit A(4) corresponding to the possible bit histories ({s,t,u,v}, {w,x,y,z}). Thus, the output of the third interleave depends on the four possible outputs of the second interleave and the four possible outputs of the third interleave. Thus, multiplexer stages 816 and 818 select an output based on {w,x,y,z} of the third interleave, and multiplexer stage 820 selects an output based on {s,t,u,v} of the second interleave.

Figure 9:
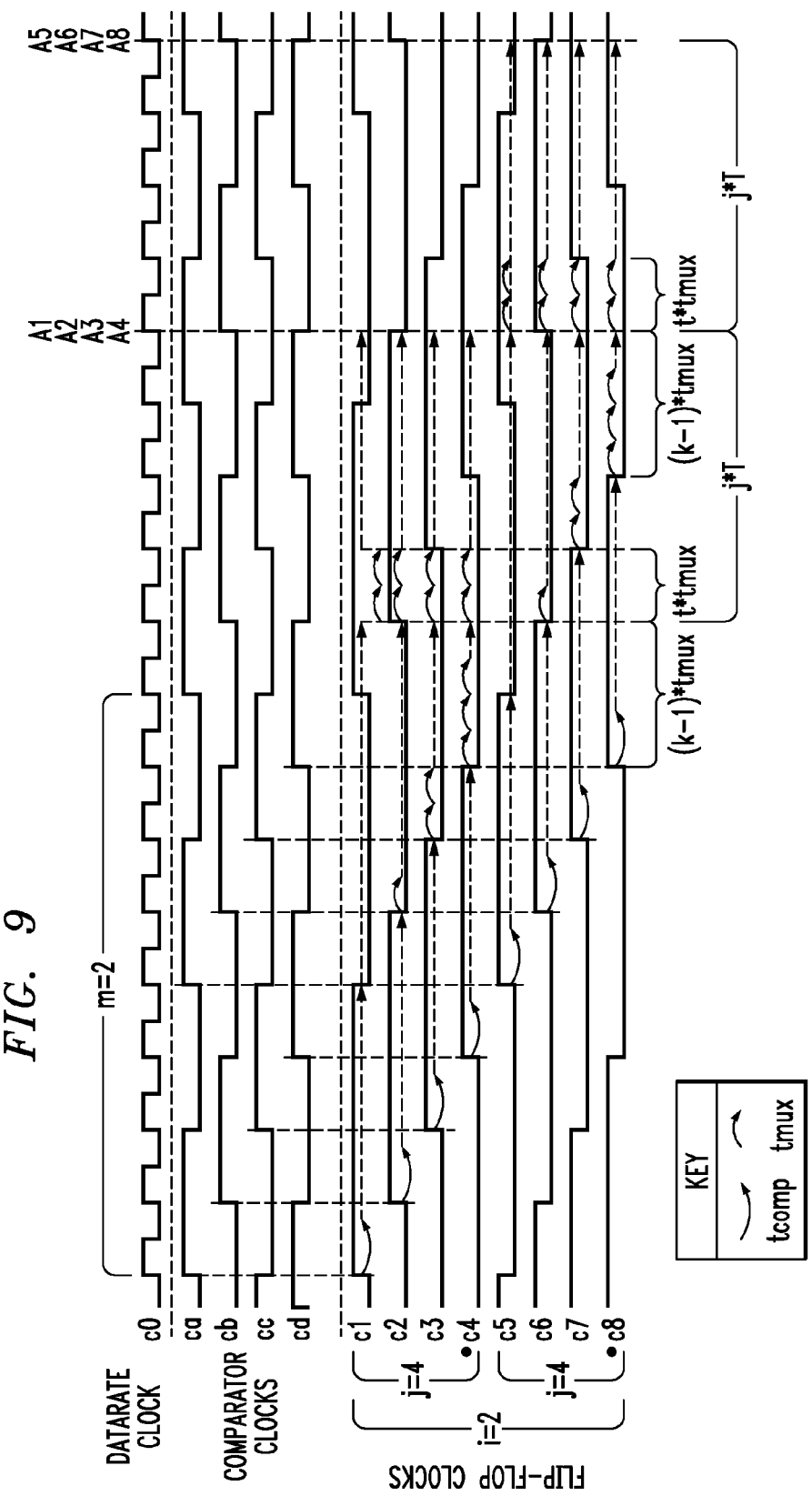
FIG. 9 shows an exemplary timing diagram of the interleaved and retimed predictive selection DFE of FIG. 8.

As shown in the exemplary timing diagram of FIG. 9, applying predictive selection to an exemplary 65 nm standard cell SERDES device, the number of clock domains, 2j, with 4 DFE taps at a baud rate of 6 Gbps ($t_{mux}$=60 ps, $t_{cq}$=120 ps, and $t_{su}$=60 ps, T=1/(6 Gbps)≈170 ps) leads to Equation (5) yielding 2(2.47)≤2j, thus, j=3. If the data rate is doubled to 12 Gbps with 8 taps, T becomes 84 ps, leading to Equation (5) yielding 2(7.86)≤2j, thus, j=8. Thus, the drastic increase in the number of clock domains for the non-predictive DFE circuit (2j=8 at 6 Gbps to 2j=50 at 12 Gbps) has been overcome in the predictive selection DFE circuit (2j=3 at 6 Gbps to 2j=8 at 12 Gbps).

Figure 10:
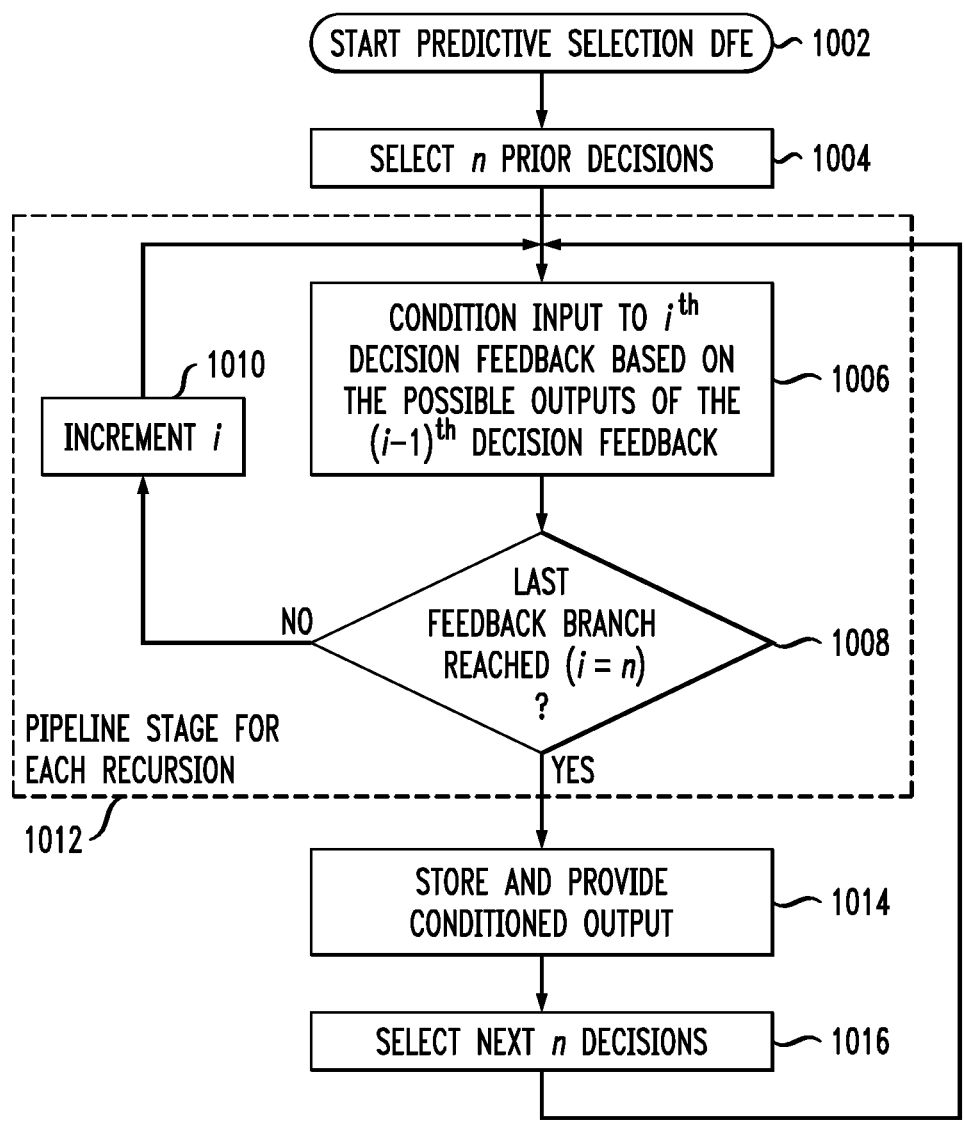
FIG. 10 shows a flow diagram of a predictive selection algorithm of the interleaved and retimed predictive selection DFE of FIG. 8 in accordance with exemplary embodiments of the present invention.

FIG. 10 shows an exemplary flow diagram of predictive selection process 1000 performed by the predictive selection DFE shown in FIG. 8. At step 1002, predictive selection is started. At step 1004, the predictive selection DFE selects a window of n prior bit decisions. At step 1006, to condition the ith decision feedback based on the predictively selected possible outputs of the (i−1)th decision feedback value. If, at step 1008, a last feedback branch of predictive selection DFE 800 is not reached, (e.g., i<n), then process 1000 proceeds to step 1010, where i is incremented, and process 1000 returns to step 1006 to condition the ith decision feedback. If, at step 1008, a last feedback branch of predictive selection DFE 800 is reached, (e.g., i=n), then process 1000 proceeds to step 1014. Steps 1006, 1008 and 1010 are performed as a pipeline stage (e.g., stored in latches 806, 836 and 886) for each recursion, as indicated by dashed line 1012.

At step 1014, predictive DFE 800 stores the predictively selected output values and provides conditioned output (e.g., A(1) through A(8) of DFE 800) for further processing by receiver 106. At step 1016, predictive selection DFE 800 selects a subsequent window of n bit decisions, and process 1000 returns to step 1006 to condition the prior decisions.

If, at step 1008, the last feedback branch is reached (e.g., when i=n), at step 1014 the conditioned output bits are saved, and provided as the output of the predictive selection DFE. At step 1016, a next window of n bit decisions is selected for conditioning by the predictive selection DFE, and process 1000 returns to step 1006 to condition the next n bit decisions.

Figure 11A:
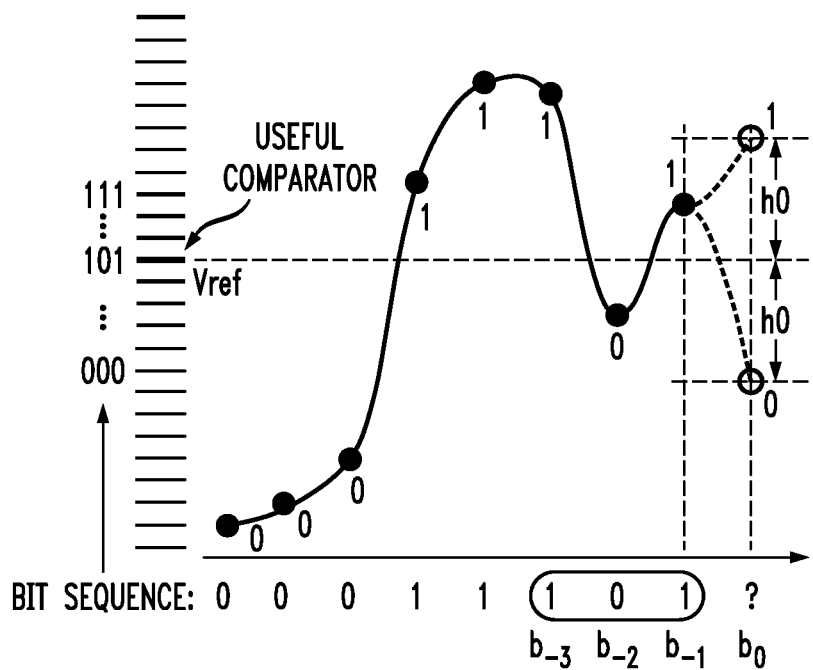
FIGS. 11A and 11B show an exemplary plot of comparator threshold voltages for the interleaved and retimed predictive selection DFE of FIG. 8 in accordance with exemplary embodiments of the present invention.

Some embodiments of the present invention might employ non-uniform quantization of the ADC front-end input signal voltage range. For example, the comparator array (e.g., comparators 804 of FIG. 8) might employ ISI-weighted threshold voltages, in contrast to a typical uniformly quantized ADC in which the received signal dynamic range is divided into equal regions. FIG. 11A shows an exemplary plot of how, for an exemplary input signal, only certain ADC comparators within the received signal dynamic range, which might typically be the dynamic range of a uniformly quantized ADC, are actually useful for quantizing a given input signal. In FIG. 11A, the right-most bit represents the cursor bit, and the pre-cursor bit could be either a 1 or a 0, as shown. For example, given the exemplary received bit sequence shown [0 0 0 1 1 1 0 1], the comparator whose threshold voltage is closest to the ISI voltage, Vref, corresponding to $\{b_{-3}b_{-2}b_{-1}\}=\{101\}$, where Vref=$h_3-h_2+h_1$, is sufficient to determine whether the cursor bit, $b_0$, is logic 0 or logic 1. If $b_0$=0, then the received signal will have a voltage of V=$h_3-h_2+h_1-h_0$. If $b_0$=1, then the received signal will have a voltage of V=$h_3-h_2+h_1+h_0$. No other comparators provide any information employed to recover the exemplary cursor bit, $b_0$.

Figure 11B:
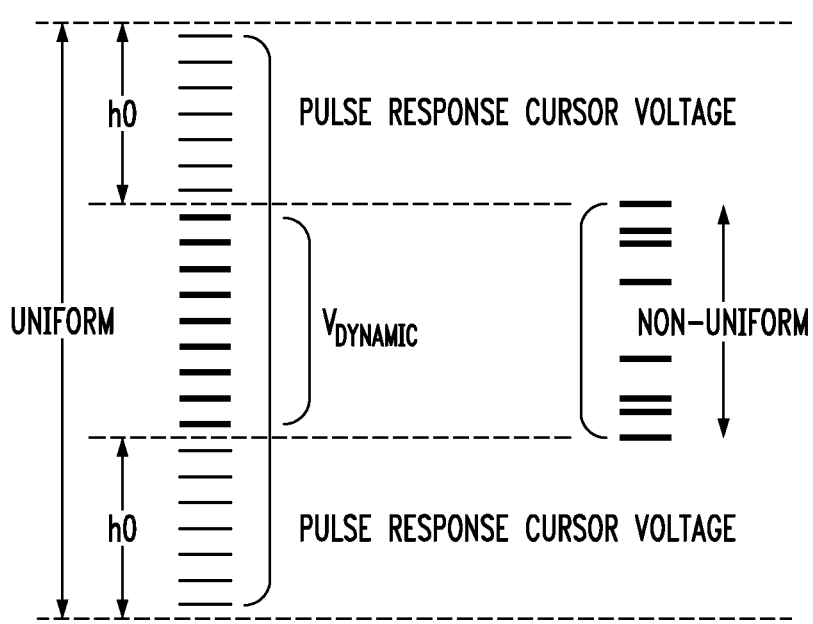

Since only the comparator associated with a particular bit history is employed to recover data bits during any given bit period, some non-essential comparators can be removed from AFE 112 of receiver 106. Removing non-essential comparators can yield significant power savings for receiver 106. Non-essential comparators are those comparators having a threshold voltage that will never correspond to a particular bit history, shown in the top and bottom regions of FIG. 11B. In an exemplary 5-tap DFE system, the pulse response cursor voltage is $h_0$=160 mV, the received signal dynamic range, $v_{dynamic}$≈700 mV (approximated by $2\Sigma_{-1}^{5}h_i$). As shown in FIG. 11B, a typical ADC might include a plurality of uniformly spaced comparators (e.g., 23 uniformly spaced comparators in the exemplary case shown in FIG. 11B). Thus, the ISI voltages corresponding to the $2^{taps}$ bit histories (e.g., $2^5$ bit histories for the exemplary 5-tap system of FIG. 11B) have an ISI dynamic range of $2\Sigma_{-1}^{5}h_i$≈340 mV. This ISI dynamic range might be approximated for a worst-case by subtracting $h_0$ from both the top and bottom of the ADC dynamic range as shown in FIG. 11B, yielding an ISI dynamic range of $V_{ISI}=V_{dynamic}-2h_0$=700−2(160)=380 mV.

Given step sizes of (700 mV)/(23 comparators)=30 mV/step for an ADC with uniformly spaced comparators, it can be seen that (380 mV)/(30 mV/step)=13 uniformly spaced comparators could be employed to cover the ISI dynamic range. However, an unrolled DFE employing a non-uniformly quantized ADC could employ many fewer comparators. For example, a power-of-two number of non-uniformly spaced comparators (e.g., 8 or 16 comparators) could be employed. The number of non-uniformly spaced comparators might be selected based on jitter tolerance, as will be described.

Reduction from 23 uniformly spaced comparators to 8 non-uniformly spaced comparators might yield a 65% reduction in power consumption by AFE 112. Further, the non-uniformly spaced comparators might be implemented with minimally-sized transistors for the silicon technology of receiver 106. For the comparator that is selected as the one with the correct threshold voltage in a given bit period (based on the DFE feedback multiplexer tree shown in FIG. 8), the received signal is either $h_0$ above or $h_0$ below this threshold voltage, as shown in FIG. 11A (more accurately, the received signal might be the threshold voltage, $V_{ref}\pm h_0\pm h_{-1}$ to account for precursor ISI). This 'guaranteed' large input voltage difference (actual system is differential) means the selected comparator regenerates quickly with nearly zero probability of metastability. For example, in 65 nm silicon, each comparator consumes less than 0.45 mW while switching at 3.3 GHz given an input voltage difference of at least 1 mV, and given an input voltage difference approximately $h_0$=160 mV, the comparators regenerate at the 12.5 Gbps baud rate. This regeneration time constraint can be further relaxed by interleaving multiple comparator arrays as described herein. Accounting for other circuits in the receiver 106 (e.g., DBE 128), the worst case receiver power consumption for the channel and baud rate described in regard to FIG. 10B is approximately 25 mW. In comparison, a uniformly quantized ADC-based receiver is estimated to consume approximately 165 mW.

Receiver 106 also recovers timing information from a received signal, for example using a phase detector in clock recovery block 126. Two commonly used phase detectors are bang-bang (or Alexander) phase detectors and baud rate (e.g., Mueller-Müller) phase detectors. Bang-bang phase detectors (BBPDs) employ signal oversampling (e.g., sampling twice per unit interval), and thus might not be practical for high baud rates. Furthermore, in a fully unrolled DFE, there are theoretically $2^{taps}$ zero crossing transitions per unit interval. Consequently, it might be desirable for some embodiments to employ a baud rate phase detector to minimize receiver circuit complexity and power consumption. However, a baud rate phase detector might typically require the received signal to be shaped to have symmetrical pulse response or zero-forced pulse response.

Vertical eye opening is the sum of the worst case voltage margin above and below the data slicer comparator reference voltage. As described herein, for embodiments employing a fully unrolled DFE, each $2_{taps}$ reference is an ISI-weighted value based on a speculative bit history. The voltage margin, $m_k$, for a particular data bit is the difference between the equalized signal, $y_k$, and the reference voltage, $Vref_k$.

FIG. 12 shows an exemplary block diagram of a timing recovery circuit. As shown in FIG. 12, described embodiments employ voltage margin baud rate timing recovery (margin detector 1208). As described herein, voltage margin timing recovery extracts timing information and determines the optimal data sampling phase as the phase yielding a maximum vertical eye opening (e.g., a maximum worst case voltage margin of a sampled received signal), for example in an eye diagram such as shown in FIG. 2. However, described embodiments might also employ a bang-bang phase detector (BBPD 1210) to detect and recover timing information from Nyquist patterns (e.g., a pattern of alternating ones and zeros { ... 101010 ... }) in the received sampled signal.

As shown in FIG. 12, AFE 1202 includes analog-to-digital converter (ADC) 1204 and shift register 1206. Although shown as a shift register, 1206 might be implemented as any memory or storage unit. AFE 1202 provides quantized values for each bit sample from ADC 1204 to margin phase detector (PD) 1208 and bang-bang phase detector (BBPD) 1210. The output of margin PD 1208 is provided to phase adjuster 1214 and BBPD deskew module 1220. The output of BBPD 1210 is also provided to phase adjuster 1214 and BBPD deskew module 1220. Phase adjuster 1214 and BBPD deskew module 1220 operate to adjust the phase of sampling of ADC 1204 and zero crossing comparator 1218 (e.g., by adjusting the output frequency of phase-locked loop (PLL) 1216). The specific operation of margin PD 1208, BBPD 1210, phase adjuster 1214 and BBPD deskew module 1220 will be described subsequently.

Voltage margin phase detector 1208 tracks the voltage margin of transitioning symbols in the received equalized signal, m, and determines the average value over n bit periods. Non-transitioning bits can be ignored, since non-transitioning bits carry no timing information. The average margin is compared to a target margin, m*. Neglecting residual ISI and noise, the worst case voltage margin at receiver 106 occurs for a "runt" pulse. A runt pulse is, for example, the logic-0 bit in the data sequence { ... 1110111 ... }. The worst case voltage margin is maximized at the optimal sampling phase, $\Phi_{opt}$.

Figure 13:
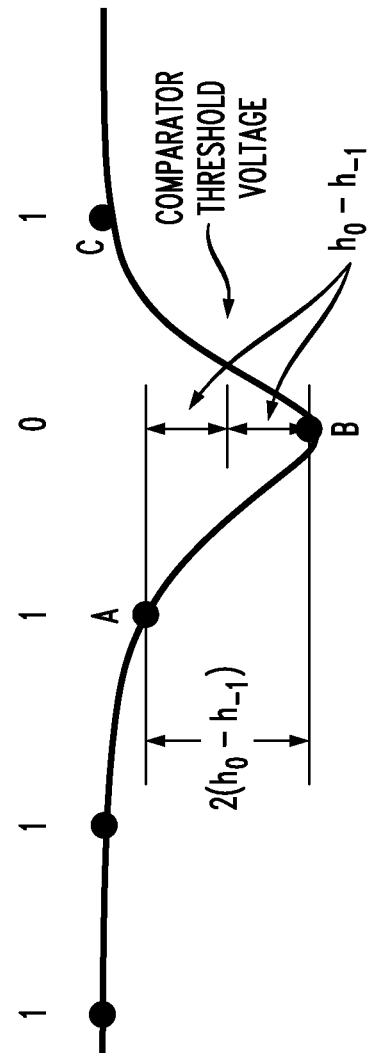
FIG. 13 shows an exemplary plot of worst-case voltage margin of a receiver in accordance with exemplary embodiments of the present invention.

FIG. 13 shows a plot of three exemplary consecutively received bits, A, B, and C. As shown, a worst case voltage margin for a "runt" pulse (bit B) corresponds to the example bit sequence {ABC}={101}. In an ISI-weighted comparator array as described herein, a comparator threshold voltage is located at the midpoint between A and B during bit period B. Considering that bit A has a voltage of $h_0-h_{-1}$ (since bit A is a '1'), and bit B has a voltage of $-h_0+h_{-1}$ (since bit B is a '0'), the maximum voltage margin, m, is given by Equation (6):

$$m = \frac{(A-B)}{2} = \frac{(h_0 - h_{-1} + h_0 - h_{-1})}{2} = h_0 - h_{-1} \qquad (6)$$

This worst case voltage margin is maximized at the optimal sampling phase, $\Phi opt$, which is located slightly to the left of the peak of the pulse response (later in time) as shown in FIG. 4 (as the sampling phase shifts left, $h_{-1}$ decreases more rapidly than $h_0$, thereby increasing the margin, $h_0-h_{-1}$, up to a maximum). Any deviation from the ideal sampling location at B in FIG. 13 reduces the voltage margin from this maximum value. However, if the voltage margin is determined to be less than the maximum, described embodiments determine whether the reduction in voltage margin is the result of early or late sampling.

Figure 14A:
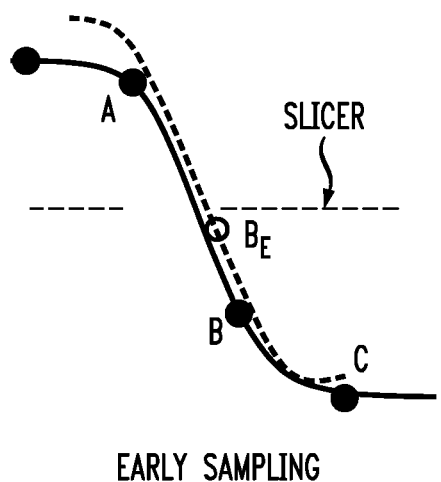
FIG. 14A shows an exemplary plot of average voltage margin for early sampling by a receiver in accordance with exemplary embodiments of the present invention.

To determine whether the reduction in voltage margin is the result of early or late sampling, described embodiments constrain bit C to a specific value, for example, the same value as bit B. Thus, possible bit sequences {ABC} are either {011} or {100}. FIGS. 14A and B show the exemplary case where the bit sequence {ABC} is {100}. For either of these two sequences, if the voltage margin is determined to be less than the maximum, it is possible to determine whether the margin reduction is due to early or late sampling. Early sampling ($B_E$) yields a decreased margin while late sampling ($B_L$) yields an increased margin, with respect to a target voltage margin value.

Voltage margin phase detector 1208 measures the voltage margin for all received and sampled {011} or {100} bit sequences over a selected number of bit periods and averages the result. The measurement might be performed using the ISI-weighted comparators of AFE 1202 and is thus would only be an approximation compared to measurements employing a uniformly quantized ADC front-end. However, this approximate average voltage margin is sufficiently accurate to exceed most jitter tolerance specifications.

Figure 14B:
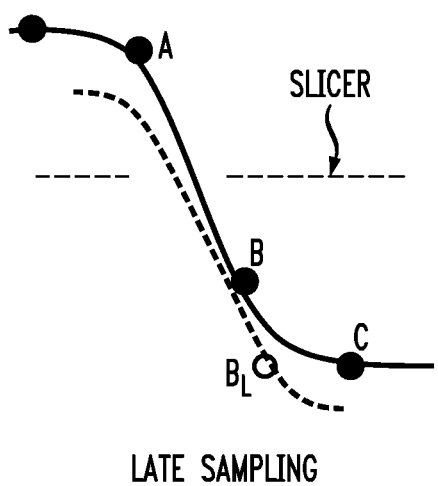
FIG. 14B shows an exemplary plot of average voltage margin for late sampling by a receiver in accordance with exemplary embodiments of the present invention.

Relative to the ideal data sampling phase, $\Phi_{opt}$, early sampling causes $h_0$ to decrease more rapidly than $h_{-1}$, which decreases the margin for both bits B and C as shown FIG. 14A. For early sampling, $h_0$ again decreases slightly ($h_{-1}$ increases slightly if non-zero), while most $h_j$ with j>0 decrease, with $h_1$ decreasing most drastically. The equalizer, however, continues to equalize using the larger previously determined $h_j$ values, over-equalizing the signal and causing a negative residual equalizer error that decreases margin, m. The net effect is a decrease in the voltage margin, m. Late sampling causes $h_{-1}$ to increase more rapidly than $h_0$, which slightly decreases the margin for bit B, but increases the margin for bit C as shown in FIG. 14B. The net effect is an increase in voltage margin, m. For late sampling, $h_0$ (and $h_{-1}$ if non-zero) decreases slightly while most $h_j$ with j>0 increase, with $h_1$ increasing most drastically. The equalizer, however, continues to equalize using the smaller previously determined $h_j$ values, under-equalizing the signal and causing a positive residual equalizer error that increases margin m. Thus, the average voltage margin is proportional to the sampling phase: early sampling decreases average margin while late sampling increases average margin.

Assuming that voltage margin phase detector 1208 samples at an ideal data sampling phase for a bit sequence $b_k$ for n samples. Voltage margin phase detector 1208 averages the margins of all {011} or {100} sequences and ignores other bit sequences (e.g., {110}, etc.). Because the DFE cancels post-cursor ISI, and assuming only one non-negligible precursor ISI value, $h_{-1}$, the average voltage margin is given by Equation (7):

$$m = \frac{n}{2}|-h_0 - h_{-1}| + \frac{n}{2}|h_0 + h_{-1}| \quad (7)$$

Thus, sampling at the ideal data sampling phase, $\Phi_{opt}$, yields the target voltage, m*, given by Equation (8):

$$m^* = h_0 + h_{-1} \quad (8)$$

For a channel with no precursor ISI, $\Phi_{opt}=0$. If the sampling phase is early, voltage margin phase detector 1208 determines an average margin that is less than m*, and if the sampling phase is late, voltage margin phase detector 1208 determines an average margin that is greater than m*, as shown in the truth table, Table 2:

TABLE 2

| Timing Function | Phase | | |
|---|---|---|---|
| | early | aligned | late |
| Averaged margins for {011} and {100} sequences | <$h_0 + h_{-1}$ | =$h_0 + h_{-1}$ | >$h_0 + h_{-1}$ |

Embodiments of voltage margin phase detector 1208 work for an arbitrary pulse response by tracking the average margin of only transitioning bits that are followed by another bit (future bit) with the same logic value as the transitioning bit (e.g., {011} or {100} sequences, where the transitioning bit is in bold). As described, early sampling relative to $\Phi_{opt}$ decreases the margin for a bit and late sampling increases the margin of a bit. Within the {011} or {100} sequence constraint, the margin for transitioning bit sequences is averaged over n received bits, yielding the timing function for an arbitrary pulse response shown in Table 2. The margin for bits that do not satisfy the {011} or {100} sequence criterion is set to the target voltage margin, m*, to stabilize and smooth out the behavior of voltage margin phase detector 1208.

Voltage margin phase detector 1208 relies on the margin of {011} or {100} sequences decreasing for early sampling and increasing for late sampling, generalized by the error equation given in Equation (9):

$$E(\Phi)=-[h_1(\Phi)-h_1(\Phi_{opt})]+\ldots+[h_0(\Phi)-h_0(\Phi_{opt})]+[h_{-1}(\Phi)-h_{-1}(\Phi_{opt})] \quad (9)$$

Figure 15:
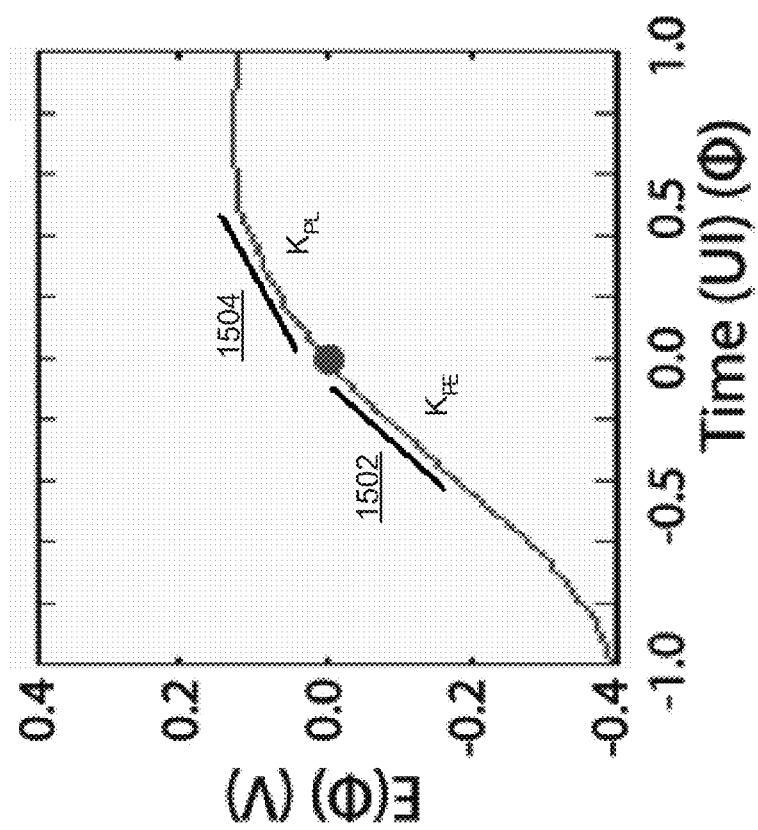
FIG. 15 shows an exemplary plot of the error signal of a receiver in accordance with exemplary embodiments of the present invention.

FIG. 15 shows E($\Phi$) for an exemplary reference channel. The inverse of the slope of the error equation, $$\frac{\partial E(\Phi)}{\partial t} = \frac{\Delta V}{\Delta t},$$

is the proportionality constant, $k_p$, in a second order timing recovery loop filter. Because the slope of E($\Phi$) might be different for early sampling (shown as slope 1502) and late sampling (shown as slope 1504) relative to $\Phi_{opt}$, embodiments of the present invention define separate proportionality constants, $k_{pE}$ and $k_{pL}$ for early and late sampling, respectively.

Figure 16:
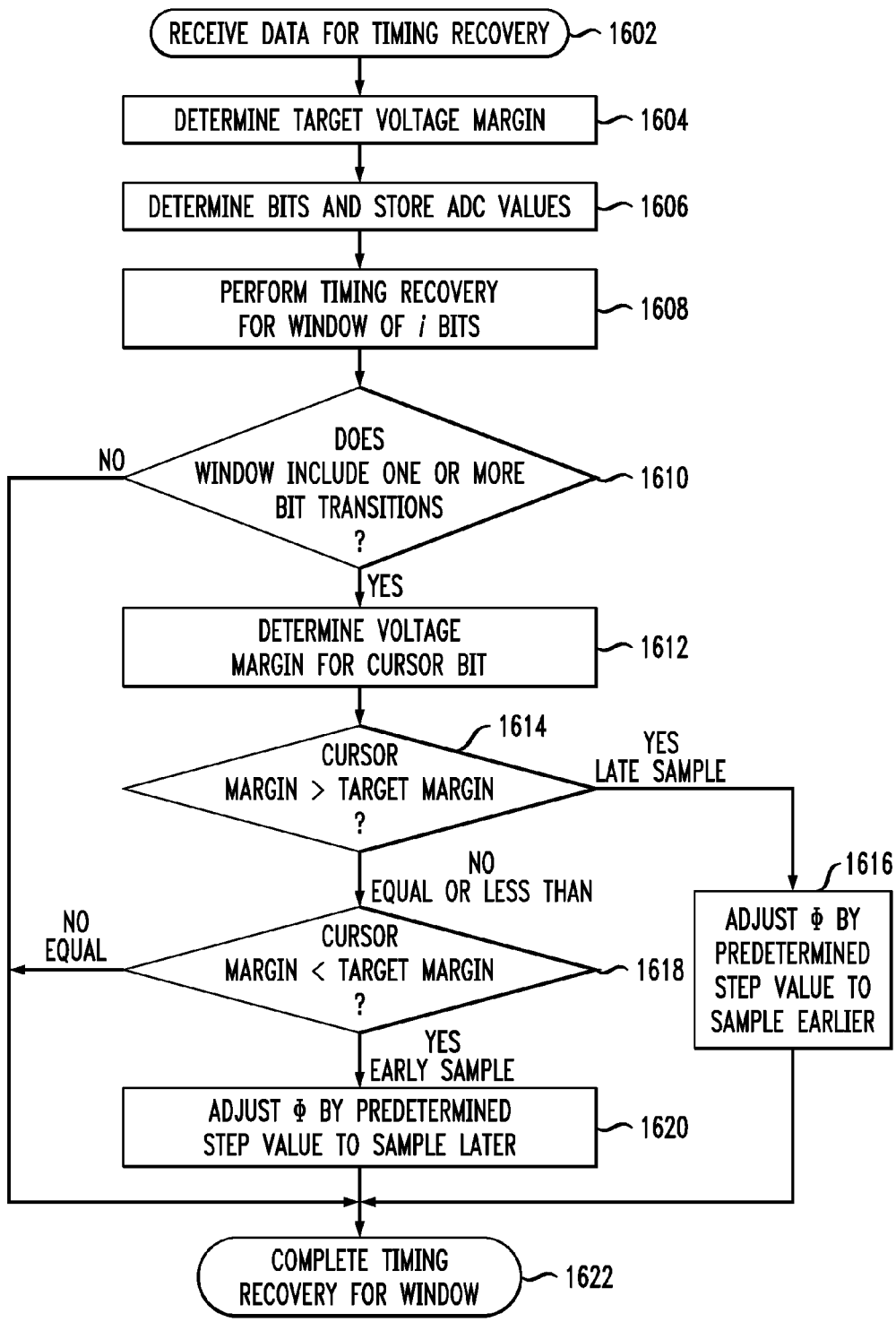
FIG. 16 shows a flow diagram of a timing recovery algorithm for a receiver employing the bang-bang detector of FIG. 12 in accordance with exemplary embodiments of the present invention.

FIG. 16 shows an exemplary flow diagram of timing recovery process 1600 performed by margin phase detector 1208. At step 1602, margin phase detector 1208 determines the target voltage margin, m*. At step 1606, margin phase detector 1208 determines bits and stores ADC values. At step 1608, margin phase detector 1208 performs timing recovery for a window of i bits. At step 1610, margin phase detector 1208 determines whether the window of i bits includes one or more bit transitions. If, at step 1610, the window of i bits includes no bit transitions (e.g., all the bits were the same value), no timing data can be recovered, and at step 1622, process 1600 completes. If, at step 1610, the window of i bits includes one or more bit transitions, timing data can be recovered, and process 1600 proceeds to step 1612.

At step 1612, margin phase detector 1208 determines a voltage margin for the cursor bit of the i bit window. At step 1614, if the cursor voltage margin determined at step 1612 is greater than the target voltage margin, m*, determined at step 1604, then the sample is determined to be a late sample, and at step 1616, phase adjuster 1214 adjusts the sampling phase, $\Phi$, by a predetermined step value, and PLL 1216 correspondingly adjusts $\Phi$ to sample earlier in time. Process 1600 completes at step 1622. If, at step 1614, the cursor voltage margin determined at step 1612 is greater than the target voltage margin, m*, determined at step 1604, then, at step 1618, if the cursor voltage margin determined at step 1612 is less than the target voltage margin, m*, determined at step 1604, then the sample is determined to be an early sample and, at step 1620, phase adjuster 1214 adjusts the sampling phase, $\Phi$, by a predetermined step value, and PLL 1216 correspondingly adjusts $\Phi$ to sample later in time. Process 1600 completes at step 1622. If, based on steps 1614 and 1618, the cursor voltage margin determined at step 1612 is substantially equal to the target voltage margin, m*, determined at step 1604, then the sample is "on-time", and process 1600 completes at step 1622.

As previously described, the comparator array of AFE 112 might be interleaved to relax the timing constraints, but interleaving also makes it possible that clock skew between the interleaves might cause the interleaves to sample the received signal at phases that are not separated by exactly 1 UI with respect to each other, as desired (see the timing diagram shown in FIG. 9). Thus, some embodiments might employ an independent voltage margin phase detector 1108 for each interleave.

Figure 17:
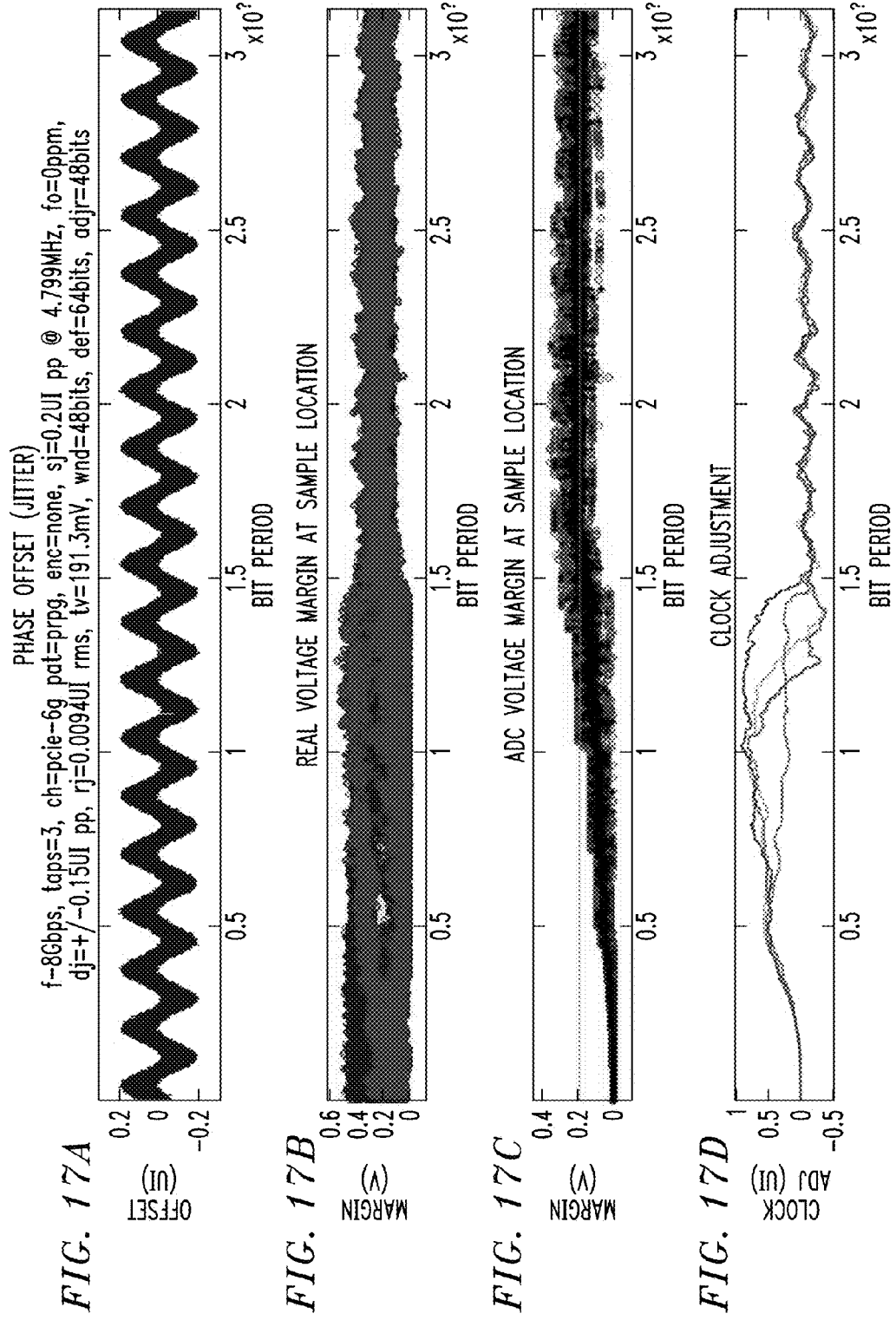

FIG. 17 shows bitwise simulation results of the predictive selection DFE shown in FIG. 8, with 4 interleaved comparator arrays and 3 taps, converging to their respective deskewed ideal sampling phases $\Phi_{opt}$ while also adapting the DFE tap coefficients. The parameters of the simulation are: 8 Gbps, PCIe Gen3 reference channel, no 8b10b encoding, SJ=0.2 UI pp @ 4.799 MHz, DJ=±0.15 UI, RJ=0.0094 UI rms, and 48-bit averaging window. FIG. 17A shows the sinusoidal jitter at receiver 106 and FIG. 17D shows the four comparator array interleaves each successfully tracking this jitter. FIG. 17B shows the actual {011} or {100} sequence average margins, where blue indicates no {011} or {100} transition and red indicates a {011} or {100} transition. FIG. 17C shows the {011} or {100} sequence average margins as determined by the ISI-weighted comparator arrays employed by voltage margin phase detector 1208, where black indicates no {011} or {100} transition and red indicates a {011} or {100} transition. The green horizontal line indicates the target voltage margin, m*, which in this example is approximately 191.3 mV.

As described herein, voltage margin phase detector 1208 is unable to extract timing information for a Nyquist sequence (e.g., a pattern of alternating ones and zeros { . . . 101010 . . . }), because a Nyquist sequence does not include any {011} or {100} sequences. Thus, as shown in FIG. 12, voltage margin phase detector 1208 is supplemented with bang-bang phase detector (BBPD) 1210 to extract timing information during Nyquist sequences. After a predetermined number of alternating bits, q, is received, BBPD 1210 is triggered. For an unrolled DFE, q is desirably selected to be greater than, or equal to, the number of taps. This selection of q collapses the $2^{taps}$ ISI-weighted zero crossing thresholds to a single threshold and improves jitter tolerance. Triggering BBPD 1210 causes a threshold crossing slicer (zero crossing comparator 1218), operating at $\Phi_{BBPD}$ which is 0.5 UI earlier in time from the transitioning bit, to be activated. In some embodiments, zero crossing comparator 1218 might be continually sampling, but this would consume power during non-Nyquist sequences when BBPD 1210 (and, thus, comparator 1218) is not employed by receiver 106.

When BBPD 1210 is triggered, the output (shown as $y_{k-0.5}$ in FIG. 2) from zero crossing comparator 1218 operating at phase $\Phi_{BBPD} \approx -0.5$ UI is observed. Table 3 shows a truth table for transitioning sequences of BBPD 1210:

TABLE 3

| $Y_{k-1}$ | $Y_{k-0.5}$ | $Y_k$ | Phase | BBPD Margin |
|---|---|---|---|---|
| 0 | 0 | 1 | Early | $m^* - \delta$ |
| 0 | 1 | 1 | Late | $m^* + \delta$ |
| 1 | 0 | 0 | Late | $m^* + \delta$ |
| 1 | 1 | 0 | Early | $m^* - \delta$ |

As shown in Table 3, the rightmost column shows the mapping from early/late BBPD outputs to decreased/increased margins, respectively, to complement margin phase detector 1208. As shown in Table 3, an early output of BBPD 1210 is mapped to a margin of $m^* - \delta$ and a late output of BBPD 1210 is mapped to $m^* + \delta$. The value of $\delta$ might be determined empirically for a given connected communication channel. In some embodiments, $\delta \approx 0.1 m^*$ is employed to track sinusoidal jitter (SJ) and frequency offset (FO).

The presumed optimal sampling phase for zero crossing comparator 1218 is $\Phi_{BBPD} = \Phi_{opt} - 0.5$ UI. However, process variation, circuit non-idealities, sinusoidal jitter and frequency offset might alter or modulate the -0.5 UI phase offset. Thus, in some embodiments, margin PD 1208 automatically and continually adjust the sampling phase for BBPD 1210. As shown in FIG. 12, the output of margin PD 1208 is provided to BBPD deskew module 1220.

Over the course of a sufficiently large number of received bits, BBPD 1210 should desirably detect the same ratio of early and late sampling phases as margin PD 1208. Thus, some embodiments track the ratios with one or more counters, shown generally in BBPD deskew module 1220 as counters 1222 and 1228. As shown, MD counter 1222 tracks a number of early sampling phases detected by margin PD 1208 in early counter 1224, and a number of late sampling phases detected by margin PD 1208 in late counter 1226. Similarly, BBPD counter 1228 tracks a number of early sampling phases detected by BBPD 1210 in early counter 1232, and a number of late sampling phases detected by BBPD 1210 in late counter 1230. After a predetermined number of bits (e.g., 160 bits), the values of the counters are compared. If BBPD 1210 determined a greater ratio of early samples than margin PD 1208, $|\Phi_{BBPD}|$ is decreased (e.g., moved later in time). If BBPD 1210 determined a greater ratio of late samples than margin PD 1208, $|\Phi_{BBPD}|$ is increased (e.g., moved earlier in time). If BBPD 1210 and margin PD 1208 determined approximately equal ratios of early and late samples, $|\Phi_{BBPD}|$ is not changed.

The $\Phi_{BBPD}$ increment or decrement amount might be a fixed portion of the unit interval, (e.g., 0.01 UI), or might be based on one or more gear-shifting amounts to allow for course and fine adjustments based on the differences between the ratios. For the same reason that dual proportionality constants, $k_{pE}$ and $k_{pL}$, might be defined as described with regard to FIG. 15 for margin PD 1208, some embodiments might desirably define dual mapping values for BBPD 1210, for example $\delta_E$ to adjust early sampling phases and $\delta_L$ to adjust late sampling phases. In some embodiments, to ensure stability of clock recovery as a whole, (1) the sampling phase of margin PD 1208, $\Phi_{OPT}$, might not be adjusted by BBPD deskew module 1220 (instead is updated by phase adjuster 1214), and (2) the time constant of the operating loop for BBPD deskew module 1220 is desirably selected to be several times larger than that of operating loop for phase adjuster 1214.

FIG. 18 shows an exemplary flow diagram of timing recovery process 1800 performed by BBPD 1210 of FIG. 12. At step 1802, receiver 106 receives data from which timing information should be recovered. At step 1804, the desired target voltage margin, m*, is determined, for example by margin phase detector 1208. At step 1806, bit values for ADC samples are determined, and the ADC values for a window of i bits are saved, for example to register 1206. At step 1808, BBPD 1210 determines whether the window of i bits includes one or more Nyquist patters (e.g., a pattern of alternating ones and zeros { . . . 101010 . . . }). If, at step 1808, there are no Nyquist patterns in the given bit window, at step 1822, timing recovery process 1800 might complete. Alternatively, at step 1822, timing recovery process might return to step 1806 to determine bit values for ADC samples for a subsequent window of i bits, as indicated by dashed line 1824. At step 1808, if a window of i bits includes one or more Nyquist patterns, process 1800 proceeds to step 1810, where bang-bang trap 1212 is optionally enabled if bang-bang trap 1212 had been previously disabled.

At step 1812, bang-bang trap 1812 determines whether a given bit transition in the window of i bits is a 0 to 1 or a 1 to 0 transition. If, at step 1812, the transition is a 0 to 1 transition, at step 1816, zero crossing comparator 1218 determines whether the sample value at the zero crossing (e.g., at $y_{k-0.5}$ as shown in FIG. 2) is equal to 0. If the sample value is equal to 0, the sample occurred early in time, and, at step 1818, the target voltage margin, m*, is reduced by a predetermined step value by phase adjuster 1214, and PLL 1216 correspondingly adjusts $\Phi_{BBPD}$ to sample later in time. If, at step 1816, the sample value is equal to 1, the sample occurred late in time, and, at step 1820, the target voltage margin, m*, is increased by a predetermined step value by sampling phase adjuster 1214, and PLL 1216 correspondingly adjusts $\Phi_{BBPD}$ to sample earlier in time.

If, at step 1812, the transition is a 1 to 0 transition, at step 1814, zero crossing comparator 1218 determines whether the sample value at the zero crossing (e.g., at $y_{k-0.5}$ as shown in FIG. 2) is equal to 1. If the sample value is equal to 1, the sample occurred early in time, and, at step 1818, the target voltage margin, m*, is reduced by a predetermined step value by phase adjuster 1214, and PLL 1216 correspondingly adjusts $\Phi_{BBPD}$ to sample later in time. If, at step 1814, the sample value is equal to 0, the sample occurred late in time, and, at step 1820, the target voltage margin, m*, is increased by a predetermined step value by sampling phase adjuster 1214, and PLL 1216 correspondingly adjusts $\Phi_{BBPD}$ to sample earlier in time. At step 1818, counter 1232 might be incremented corresponding to tracking a count of early samples detected by bang-bang trap 1212 for a given bit window, and similarly, at step 1820, counter 1230 might be incremented corresponding to tracking a count of late samples detected by bang-bang trap 1212 for a given bit window.

After steps 1818 and 1820, process 1800 proceeds to step 1819. At step 1819, bang-bang trap 1212 determines whether the last Nyquist pattern in the current window of i bits has had timing recovery performed. If yes, at step 1820, bang-bang trap 1212 (and zero crossing comparator 1218) might optionally be disabled, for example to reduce power consumption of the receiver. At step 1822, timing recovery process 1800 might complete. Alternatively, at step 1822, timing recovery process might return to step 1806 to determine bit values for ADC samples for a subsequent window of i bits, as indicated by dashed line 1824. If, at step 1819, the last Nyquist pattern in the current window of i bits has not yet had timing recovery performed, process 1800 returns to step 1812 to perform timing recovery for a subsequent Nyquist pattern in the current bit window.

FIG. 19 shows an exemplary flow diagram of bang-bang timing recovery deskew process 1900 performed by bang-bang deskew module 1220 of FIG. 12. At step 1902, BBPD deskew module 1220 starts process 1900 to calibrate the outputs of margin detector 1208 and BBPD 1210. At step 1904, counters 1222 (e.g., including early counter 1224 and late counter 1226) and 1228 (e.g., including early counter 1232 and late counter 1230) are initialized for a given bit window or unit interval. As shown in FIG. 19, steps 1906, 1908, 1914, 1916 and 1922 (for deskewing based on BBPD 1210) might be performed in parallel with steps 1910, 1912, 1918, 1920 and 1924 (for deskewing based on margin phase detector 1208).

At step 1906, if bang-bang trap 1212 detected an early bit sample, at step 1914, early BB counter 1232 is incremented. If, at step 1906, bang-bang trap 1212 did not detect an early bit sample, at step 1908, if bang-bang trap 1212 detected a late bit sample, at step 1916, late BB counter 1230 is incremented. If, at step 1908, bang-bang trap 1212 did not detect either an early bit sample or a late bit sample, at step 1934, process 1900 competes since the sample was "on-time". After the appropriate early/late counter is updated at steps 1914 and 1916, respectively, at step 1922, BB deskew module 1220 determines a ratio of early BB counter 1232 and late BB counter 1230 for a given Nbit window of received bits. Process 1900 proceeds to step 1926.

At step 1910, if margin phase detector 1208 detected an early bit sample, at step 1918, early MD counter 1224 is incremented. If, at step 1910, margin phase detector 1208 did not detect an early bit sample, at step 1912, if margin phase detector 1208 detected a late bit sample, at step 1920, late MD counter 1226 is incremented. If, at step 1912, margin phase detector 1208 did not detect either an early bit sample or a late bit sample, at step 1934, process 1900 competes since the sample was "on-time". After the appropriate early/late counter is updated at steps 1918 and 1920, respectively, at step 1924, BB deskew module 1220 determines a ratio of early MD counter 1224 and late MD counter 1226 for a given Nbit window of received bits. Process 1900 proceeds to step 1926.

At step 1926, the ratio of early BB counter 1232 and late BB counter 1230 is compared to the ratio of early MD counter 1224 and late MD counter 1226. If, at step 1926, BBPD 1210 determined a greater ratio of early samples than margin PD 1208, $|\Phi_{BBPD}|$ is decreased (e.g., moved later in time) at step 1928, for example by phase adjuster 1214. Process 1900 then completes at step 1934. If, at step 1926, BBPD 1210 did not determine a greater ratio of early samples than margin PD 1208, then at step 1930, if BBPD determined 1210 determined a greater ratio of late samples than margin PD 1208, $|\Phi_{BBPD}|$ is increased (e.g., moved earlier in time) at step 1932, for example by phase adjuster 1214. Process 1900 then completes at step 1934. If, based on steps 1926 and 1930, BBPD 1210 and margin PD 1208 determined approximately equal ratios of early and late samples, $|\Phi_{BBPD}|$ is not changed, and process 1900 completes at step 1934.

FIGS. 20A-C show plots of the phase adjustment and sampling phase of the voltage margin and BBPD timing recovery system of FIG. 12 operating in conjunction with the predictive DFE shown in FIG. 8. Table 4 shows the system parameters, and Table 5 shows the injected timing impairments, to achieve the results shown in FIGS. 20A-C:

TABLE 4

| Parameter | Value |
| --- | --- |
| Data Rate | 8 Gbps, NRZ |
| Silicon Technology Node | 65 nm standard cell |
| Channel Type | PCIe Gen3 8 Gbps |
| AFE characteristics | Sense Amp comparator array with 4× interleaving |
| DFE characteristics | 3 tap fully unrolled, retimed predictive DFE with 4× interleaving |
| Test bit pattern | Pseudo-random bit sequence with no encoding |
| Target Voltage Margin, m* | 290.1 mV |
| Margin averaging window, q | 16 bits per phase |
| Timing Loop time constant | 64 UI per phase |
| BBPD window | 160 bits per phase |
| BBPD phase adjustment step size | 0.01 UI |

TABLE 5

| Timing Impairment | Value |
| --- | --- |
| Low Frequency Sinusoidal Jitter (LFSJ) | As shown in FIG. 18A |
| High Frequency Sinusoidal Jitter (HFSJ) | 10 ps peak-to-peak at 10, 100 and 1000 MHz |
| Frequency Offset (FO) | none |
| Low Frequency Random Jitter (LFRJ) | 8 ps rms |
| High Frequency Random Jitter (HFRJ) | 1.4 ps rms |
| Duty Cycle Distortion (DCD) | 4 ps peak-to-peak |
| Spread Spectrum Clocking (SSC) | 75 ps peak-to-peak, 33 kHz triangular wave |

FIG. 20 shows error-free bitwise simulation of the margin-based PD maintaining phase lock and FIG. 21 shows the jitter tolerance curve for 106 bits, exceeding the jitter mask with sufficient margin left over to achieve $10^{-15}$ BER, even if additional impairments (e.g., power supply noise) are present. FIG. 20C shows the automatic deskew of the 4 independent BBPD sampling phases with respect to their 4 independent margin-based data sampling phases.

FIG. 22 shows histograms of the achieved voltage margin for each of 106 received bits, where red indicates the margin with BBPD deskew module 1120 activated, and blue indicates the margin with BBPD deskew module 1120 deactivated. As shown in FIG. 22, the improvement in the voltage margin due to the BBPD deskew is evident from the resulting tighter histogram with BBPD deskew module 1120 activated. As shown in FIG. 22, BBPD deskew module 1120 yields more received data symbols with voltage margin near $h_0$ (approx. 0.24V) and fewer symbols with voltage margin near $h_0 \pm h_{-1}$ (approx 0.24±0.05V).

The threshold crossing sampling phase of BBPD 1110, $\Phi_{BBPD}$, relative to the data sampling phase, ($\Phi_{opt}$, varies as a function of the magnitude of sinusoidal jitter (SJ). When SJ is insignificant, $\Phi_{BBPD}$ trends later in time (closer to the transitioning bit), and when SJ is significant, $\Phi_{BBPD}$ trends earlier in time (away from the transitioning bit). Given SJ frequency of 10 MHz, $\Phi_{BBPD} \approx -0.57$ UI for 0 ps peak-to-peak, $\Phi_{BBPD} \approx -0.54$ UI for 20 ps peak-to-peak, and $\Phi_{BBPD} \approx -0.49$ UI for 30 ps peak-to-peak sinusoidal jitter.

Thus, margin detector 1108 extracts timing information for high speed SERDES receivers by maximizing the worst case voltage margin of the received signal (vertical eye opening) without requiring pulse response shaping (e.g., symmetry or zero-forcing), and BBPD 1110 maintains phase lock during Nyquist sequences. Margin detector 1108 and BBPD 1110 achieve excellent jitter tolerance.

Some embodiments also provide for pulse response tap adaptation. The tap adaptation determines the data comparator threshold voltages for data recovery with maximum voltage margin, and identifies the target voltage margin, m*, for use in clock recovery. Tap adaptation might be "blind" (e.g., starting from 0), or might start from a predetermined default value to make adaptation faster. In a fully unrolled, retimed, and predictive DFE, such as shown in FIG. 8, the DFE tap values for data comparator threshold values need to be determined. As described herein, for each DFE comparator (or multiple equivalent comparators for an interleaved AFE), the comparator threshold voltage is selected to be the midpoint between the two possible voltage levels corresponding to the bit history assigned to that comparator (e.g., either the corresponding ISI plus $h_0$ if $b_0=1$, or the corresponding ISI minus $h_0$ if $b_0=0$). Thus, adaptation is possible by determining the two possible signal voltage levels through successive estimations of the signal levels using one or more comparators with variable thresholds, and then computing the midpoint value for the threshold voltage of that DFE comparator.

FIG. 23 shows a block diagram of adaptation module 2300. As shown in FIG. 23, tap adaptation module 2300 includes digital-to-analog converters (DAC) 2302 and variable-threshold adaptation comparators 2304. The output of comparators 2304 is provided to counter control logic 2306. Although shown in FIG. 23 as two DACs and two comparators, some embodiments might employ only one DAC and one comparator, although having only one DAC and one comparator doubles the tap convergence time versus having two comparators, as shown. A data recovery module 124 includes a demultiplexer 2330, DACs 2332, comparators 2334, and multiplexer 2336.

At equilibrium, and for a specified bit history, the output of adaptation comparators 2304 is either logic-0 or logic-1 with a ratio of approximately 1:1 (e.g., half the time the received signal is above the threshold, half the time it is below). A non-1:1 ratio indicates the variable threshold of one of comparators 2304 is not at the correct voltage level, and the deviation from the ratio indicates the direction in which the variable threshold should be adjusted (e.g., a threshold voltage increment or decrement). This adaptation might generally be repeated for all possible bit histories, and might be implemented as a continuous process that runs in the background during operation of receiver 106. Thus, in equilibrium adaptation comparators 2304 output logic-0 and logic-1 with a 1:1 ratio. If the characteristics of channel 104 change, this comparator ratio changes and tap adaptation module 2300 correspondingly adjusts the thresholds of the data recovery comparators (e.g., the one or more comparators 2334 of data recovery module 124). FIG. 17 shows exemplary plots of the DFE tap adaptation concurrently with the timing recovery determining threshold voltages for both the data and BBPD comparators.

Counter control logic 2306 asserts an update signal to counters 2312 if the DFE bit history matches the bit history corresponding to the DFE comparator (e.g., one of comparators 2334) whose threshold is being adapted. Thus, counter control logic 2306 ensures the correct sequence of data bits is received to enable update of counters 2312. If an update of counters 2312 is required, the output of the correct adaptation comparator (e.g., one of comparators 2304) is used to indicate the direction of counter update (e.g., increment or decrement).

Adaptation control logic 2308 selects the DFE comparator threshold that is currently adapting (e.g., one of comparators 2334). On receiving an update signal, adaptation control logic 2308 selects a new comparator threshold to adapt and resets counters 2312. Adaptation control logic 2308 cycles through all tap thresholds (e.g., all of comparators 2334). Since the outputs of adaptation comparators 2304 are delayed to match the output delay of DFE 116, counter control logic 2306 determines if the outputs adaptation comparators 2304 are meaningful by comparing an n-bit address from adaptation control logic 2308 against the actual bit history. If there is a match, and the current and future data bits are also equal, counter control logic asserts an update signal to counters 2312. The output of the adaptation comparator 2304 having the variable threshold corresponding to the bit history plus the current data bit value (logic-0 or logic-1), is used as an up/down signal to indicate the count direction (increment or decrement) to an up/down counter of counters 2312.

Counters 2312 might include two sets of two counters: a (c+1)-bit up/down counter (shown as 2322) and a c-bit up-only counter (shown as 2320) for each adaptation comparator 2304. The adaptation convergence speed and resolution depends on the value of c. In some embodiments, c might be 5. Counters 2312 perform a statistical averaging function of the adaptation update information provided by comparators 2304 and DFE 116. A reset input signal zeros the up counters and sets the up/down counter to its midpoint value. When counter control logic 2306 asserts an update input signal to counters 2312, up counter 2320 is incremented and up/down counter 2322 is either incremented or decremented, based on the up/down input signal for the corresponding adaptation comparator 2304. Table 6 shows the signal assertions for the various counter conditions:

TABLE 6

| Counter | Condition | Output Signal to Update Logic 2314 |
| --- | --- | --- |
| Up only counter 2320 | Overflow | No change |
| Up/down counter 2322 | Overflow | Increment threshold voltage |
|  | Underflow | Decrement threshold voltage |

Upon receiving an input update request from counters 2312, update logic 2314 determines a step size by which to increment or decrement the threshold voltage of the corresponding adaptation comparator 2304. Based on the step size already in stepsize register 2310, the new step size is either double the current value if the direction of the update is the same as that of the previous update, or the step size is reset to a default step size in the opposite direction if the new and old directions are different. Stepsize registers 2310 might include a separate register for each of comparators 2304 and 2334. In some embodiments, there are thus $2^{taps}+1$ stepsize registers, each storing a step size for the pairs of adaptation comparators for the $2^{taps}$ DFE thresholds.

The new threshold voltage of the corresponding adaptation comparator 2304 is determined by adding the new step size to the current threshold value. The new threshold voltage of the corresponding DFE comparator 2334 is determined by taking the average between the threshold value of the corresponding adaptation comparator 2304 and the threshold value of the adaptation comparator 2304 identified by the same bit history but the opposite current data bit value. Adaptation comparator threshold registers 2318 includes $2^{taps}+1$ registers, each register storing a threshold value for a corresponding pair of adaptation comparators (e.g., 2304) for the $2^{taps}$ DFE thresholds. Data comparator threshold registers 2316 includes $2^{taps}$ registers, each register storing one of the $2^{taps}$ DFE comparator (e.g., one of 2334) thresholds. In some embodiments, each step size register might be 4 bits, and each adaptation comparator threshold register and each data comparator threshold register might be 7 bits.

FIG. 24 shows an exemplary flow diagram for tap adaptation process 2400 performed by tap adaptation module 2300 of FIG. 23. At step 2402, DFE tap adaptation process 2400 starts, for example at startup of receiver 106. At step 2404, the data comparator threshold voltages of the DFE are set predetermined initial values (e.g., by DAC 802 of FIG. 8). As described herein, the predetermined initial threshold voltages might be set at 0 for all comparators (e.g., "blind" adaptation), or might be set at one or more predetermined levels to improve adaptation convergence time. At step 2406, receiver 106 receives data from transmitter 102 via channel 104.

At step 2408, counter control logic 2306 determines a number of 0's and a number of 1's determined by each comparator over an N bit window, and correspondingly updates counters 2312 for a given bit history. If, at step 2410, the number of 1's is greater than the number of 0's determined by the given comparator, at step 2414, the reference voltage for the given comparator is increased by a predetermined step amount. Process 2400 proceeds to step 2418. If, at step 2410, the number of 1's is not greater than the number of 0's determined by the given comparator, if, at step 2412, the number of 1's is less than the number of 0's determined by the given comparator, at step 2416, the reference voltage for the given comparator is decreased by a predetermined amount. Process 2400 proceeds to step 2418. If, based on steps 2410 and 2412, the given comparator determined a substantially equal number of 1's and 0's for the bit window, the process 2400 proceeds to step 2418.

At step 2418, DFE tap adaptation process 2400 might optionally complete. As described herein, DFE tap adaptation process 2400 is repeated for each comparator 2334 of the DFE. For example, dashed line 2420 indicates that steps 2406, 2408, 2410, 2412, 2414 and 2416 might be repeated by tap adaptation module 2300 for each comparator. Thus, as indicated by dashed line 2422, process 2400 might return to step 2406 to perform tap adaptation for a subsequent comparator 2334. Additionally, some embodiments might optionally only perform tap adaptation process 2400 at one or more predetermined times of operation of receiver 106 (e.g., at startup of receiver 106). Alternatively, some embodiments might perform tap adaptation continuously throughout operation of receiver 106.

As described herein, embodiments of the invention provide a mostly digital SERDES receiver implemented in a low power architecture intended for short-reach and medium-reach channels. As described herein, a non-uniformly quantized comparator array front-end provides substantial power savings over a uniformly quantized comparator array. Digital techniques of interleaving, block processing, and predictive selection overcome the DFE iteration bound, meeting timing constraints in a standard cell implementation. Voltage margin-based timing recovery with Nyquist sequence detection simultaneously provide converging DFE tap adaptation and sampling phase adjustment for timing impairments.

While the exemplary embodiments of the invention have been described with respect to processes of circuits, including possible implementation as a single integrated circuit, a multi-chip module, a single card, or a multi-card circuit pack, the invention is not so limited. As would be apparent to one skilled in the art, various functions of circuit elements might also be implemented as processing blocks in a software program. Such software might be employed in, for example, a digital signal processor, microcontroller, or general-purpose computer. Such software might be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing some embodiments of the invention. When implemented on a general-purpose processor, the program code segments combine with the processor to provide a unique device that operates analogously to specific logic circuits. The invention can also be embodied in the form of a bitstream or other sequence of signal values electrically or optically transmitted through a medium, stored magnetic-field variations in a magnetic recording medium, etc., generated using a method and/or an apparatus of the invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Unless explicitly stated otherwise, each numerical value and range should be interpreted as being approximate as if the word "about" or "approximately" preceded the value of the value or range. Signals and corresponding nodes or ports might be referred to by the same name and are interchangeable for purposes here.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of embodiments of this invention might be made by those skilled in the art without departing from the scope of the invention as expressed in the following claims.

We claim:

1. A method of calibrating a sampling phase adjustment of a receiver, the method comprising:
generating, by an analog-to-digital converter (ADC) of the receiver, an actual ADC value for each bit sample of a received signal, each bit sample occurring at a sample phase of the receiver;
selecting, by a phase detector of the receiver, a window of n received bit samples, n a positive integer;
if the bit window includes one or more Nyquist patterns:
enabling a bang-bang trap of the phase detector;
iteratively performing, by the bang-bang-trap, for each bit transition between a first consecutive bit and a second consecutive bit in the one or more Nyquist patterns:
sampling the received signal at a zero crossing between the first and second consecutive bits;
determining the polarity of the bit transition between the first and second consecutive bits;
determining, based on the polarity of the bit transition and the sample value at the zero crossing between the first and second consecutive bits, whether the sample phase of the bit sample for the second consecutive bit is correct; and
if the sample phase is incorrect, adjusting the sample phase of the receiver by a first predetermined amount;
if one or more Nyquist patterns are absent from the bit window:
by a margin phase detector of the receiver:
determining a target voltage margin value;
determining a voltage of a cursor bit of the selected window of bit samples;
determining, based on the target voltage margin value and the voltage of the cursor bit, whether the sample phase is correct; and
if the sample phase is incorrect, adjusting the sample phase of the receiver by a second predetermined amount;
by a deskew module of the receiver:
based on the determining if the sample phase of the margin phase detector is correct or incorrect, incrementing a corresponding value of one of a margin phase early counter and a margin phase late counter;
based on the determining if the sample phase of the bang-bang trap is early or late, incrementing a corresponding value of one of a bang-bang phase early counter and a bang-bang phase late counter; and
determining, for the bit window, a ratio of the bang-bang phase early counter value to the bang-bang phase late counter value; and
determining, for the bit window, a ratio of the margin phase early counter value to the margin phase late counter value.

2. The method of claim 1, further comprising:
by the bang-bang trap:
determining the sample phase is late if one of: (1) the bit transition polarity is 0 to 1, and the sample value at the zero crossing is equal to 1, and (2) the bit transition polarity is 1 to 0 and the sample value at the zero crossing is equal to 0; and
determining the sample phase is early if one of: (1) the bit transition polarity is 0 to 1, and the sample value at the zero crossing is equal to 0, and (2) the bit transition polarity is 1 to 0 and the sample value at the zero crossing is equal to 1; and
by the margin phase detector:
determining the sample phase is late if the voltage of the cursor bit is greater than the target voltage margin value; and
determining the sample phase is early if the voltage of the cursor bit is less than the target voltage margin value.

3. The method of claim 1, further comprising:
if the bang-bang phase ratio is greater than the margin phase ratio:
reducing the sampling phase of the bang-bang trap by a predetermined step value, wherein reducing the sampling phase moves the sampling phase later in time; and
if the bang-bang phase ratio is less than the margin phase ratio:
increasing the sampling phase of the bang-bang trap by a predetermined step value, wherein increasing the sampling phase moves the sampling phase earlier in time.

4. The method of claim 3, further comprising:
if the bang-bang phase ratio is substantially equal to the margin phase ratio:
suspending the adjusting of the sampling phase of the bang-bang trap.

5. The method of claim 3, wherein the predetermined step value comprises one or more predetermined step sizes for adjustment of the sample phase.

6. The method of claim 1, comprising performing the determining by the bang-bang trap and the determining by the margin phase detector substantially concurrently.

7. The method of claim 1, further comprising:
adjusting, by the deskew module, the zero crossing sampling phase of the bang-bang trap thereby calibrating for temperature and process variation of the receiver and for sinusoidal jitter present in the received signal.

8. A non-transitory machine-readable medium, having encoded thereon program code, wherein, when the program code is executed by a machine, the machine implements a method of calibrating a sampling phase adjustment of a receiver, the method comprising:
generating, by an analog-to-digital converter (ADC) of the receiver, an actual ADC value for each bit sample of a received signal, each bit sample occurring at a sample phase of the receiver;
selecting, by a phase detector of the receiver, a window of n received bit samples, n a positive integer;
if the bit window includes one or more Nyquist patterns:
enabling a bang-bang trap of the phase detector;
iteratively performing, by the bang-bang-trap, for each bit transition between a first consecutive bit and a second consecutive bit in the one or more Nyquist patterns:
sampling the received signal at a zero crossing between the first and second consecutive bits;
determining the polarity of the bit transition between the first and second consecutive bits;
determining, based on the polarity of the bit transition and the sample value at the zero crossing between the first and second consecutive bits, whether the sample phase of the bit sample for the second consecutive bit is correct; and if the sample phase is incorrect, adjusting the sample phase of the receiver by a first predetermined amount;
if one or more Nyquist patterns are absent from the bit window:
by a margin phase detector of the receiver:
determining a target voltage margin value;
determining a voltage of a cursor bit of the selected window of bit samples;
determining, based on the target voltage margin value and the voltage of the cursor bit, whether the sample phase is correct; and
if the sample phase is incorrect, adjusting the sample phase of the receiver by a second predetermined amount;
by a deskew module of the receiver:
based on the determining if the sample phase of the margin phase detector is correct or incorrect, incrementing a corresponding value of one of a margin phase early counter and a margin phase late counter;
based on the determining if the sample phase of the bang-bang trap is early or late, incrementing a corresponding value of one of a bang-bang phase early counter and a bang-bang phase late counter; and
determining, for the bit window, a ratio of the bang-bang phase early counter value to the bang-bang phase late counter value; and
determining, for the bit window, a ratio of the margin phase early counter value to the margin phase late counter value.

9. The non-transitory machine-readable medium of claim 8, further comprising:
by the bang-bang trap:
determining the sample phase is late if one of: (1) the bit transition polarity is 0 to 1, and the sample value at the zero crossing is equal to 1, and (2) the bit transition polarity is 1 to 0 and the sample value at the zero crossing is equal to 0; and
determining the sample phase is early if one of: (1) the bit transition polarity is 0 to 1, and the sample value at the zero crossing is equal to 0, and (2) the bit transition polarity is 1 to 0 and the sample value at the zero crossing is equal to 1; and
by the margin phase detector:
determining the sample phase is late if the voltage of the cursor bit is greater than the target voltage margin value; and
determining the sample phase is early if the voltage of the cursor bit is less than the target voltage margin value.

10. The non-transitory machine-readable medium of claim 8, further comprising:
if the bang-bang phase ratio is greater than the margin phase ratio:
reducing the sampling phase of the bang-bang trap by a predetermined step value, wherein reducing the sampling phase moves the sampling phase later in time; and
if the bang-bang phase ratio is less than the margin phase ratio:
increasing the sampling phase of the bang-bang trap by a predetermined step value, wherein increasing the sampling phase moves the sampling phase earlier in time.

11. The non-transitory machine-readable medium of claim 10, further comprising:
if the bang-bang phase ratio is substantially equal to the margin phase ratio:
suspending the adjusting of the sampling phase of the bang-bang trap.

12. The non-transitory machine-readable medium of claim 10, wherein the predetermined step value comprises one or more predetermined step sizes for adjustment of the sample phase.

13. The non-transitory machine-readable medium of claim 8, comprising performing the determining by the bang-bang trap and the determining by the margin phase detector substantially concurrently.

14. The non-transitory machine-readable medium of claim 8, further comprising:
adjusting, by the deskew module, the zero crossing sampling phase of the bang-bang trap thereby calibrating for temperature and process variation of the receiver and for sinusoidal jitter present in the received signal.

15. A communication system comprising:
a transmitting device configured to transmit a signal over a communication channel to a receiver of the communication system;
an analog-to-digital converter (ADC) of the receiver configured to generate an actual ADC value for each bit sample of the signal, each bit sample occurring at an associated sample phase of the receiver;
a phase detector of the receiver configured to:
select a window of n received bit samples, n a positive integer;
if the bit window includes one or more Nyquist patterns:
enable a bang-bang trap of the phase detector;
iteratively, for each bit transition between a first consecutive bit and a second consecutive bit in the one or more Nyquist patterns:
sample the received signal at a zero crossing between the first and second consecutive bits;
determine the polarity of the bit transition between the first and second consecutive bits;
determine, based on the polarity of the bit transition and the sample value at the zero crossing between the first and second consecutive bits, whether the sample phase of the bit sample for the second consecutive bit is correct; and
if the sample phase is incorrect, adjust the sample phase of the receiver by a first predetermined amount;
if one or more Nyquist patterns are absent from the bit window, a margin phase detector of the receiver is configured to:
determine a target voltage margin value;
determine a voltage of a cursor bit of the selected window of bit samples;
determine, based on the target voltage margin value and the voltage of the cursor bit, whether the sample phase is correct; and
if the sample phase is incorrect, adjust the sample phase of the receiver by a second predetermined amount;
and wherein a deskew module of the receiver is configured to:
based on the determining if the sample phase of the margin phase detector is correct or incorrect, increment a corresponding value of one of a margin phase early counter and a margin phase late counter;
based on the determining if the sample phase of the bang-bang trap is early or late, increment a corresponding value of one of a bang-bang phase early counter and a bang-bang phase late counter;

determine, for the bit window, a ratio of the bang-bang phase early counter value to the bang-bang phase late counter value;

determine, for the bit window, a ratio of the margin phase early counter value to the margin phase late counter value;

if the bang-bang phase ratio is greater than the margin phase ratio:

reduce the sampling phase of the bang-bang trap by a predetermined step value, wherein reducing the sampling phase moves the sampling phase later in time; and if the bang-bang phase ratio is less than the margin phase ratio:

increase the sampling phase of the bang-bang trap by a predetermined step value, wherein increasing the sampling phase moves the sampling phase earlier in time.

16. The communication system of claim 15, wherein:
the bang-bang trap is further configured to:
determine the sample phase is late if one of: (1) the bit transition polarity is 0 to 1, and the sample value at the zero crossing is equal to 1, and (2) the bit transition polarity is 1 to 0 and the sample value at the zero crossing is equal to 0; and
determine the sample phase is early if one of: (1) the bit transition polarity is 0 to 1, and the sample value at the zero crossing is equal to 0, and (2) the bit transition polarity is 1 to 0 and the sample value at the zero crossing is equal to 1; and
the margin phase detector is further configured to:
determine the sample phase is late if the voltage of the cursor bit is greater than the target voltage margin value; and
determine the sample phase is early if the voltage of the cursor bit is less than the target voltage margin value.

17. The communication system of claim 15, wherein the deskew module is further configured to:
if the bang-bang phase ratio is substantially equal to the margin phase ratio:
suspend the adjusting of the sampling phase of the bang-bang trap.

18. The communication system of claim 15, wherein the determining by the bang-bang trap and the determining by the margin phase detector are configured to occur substantially concurrently.

19. The communication system of claim 15, wherein the deskew module is further configured to:
adjust the zero crossing sampling phase of the bang-bang trap thereby calibrating for temperature and process variation of the receiver and for sinusoidal jitter present in the received signal.

20. A receiver comprising:
an analog-to-digital converter (ADC) configured to generate an actual ADC value for each bit sample of a received signal, each bit sample occurring at an associated sample phase of the receiver;
a phase detector configured to:
select a window of n received bit samples, n a positive integer;
if the bit window includes one or more Nyquist patterns:
enable a bang-bang trap of the phase detector;
iteratively, for each bit transition between a first consecutive bit and a second consecutive bit in the one or more Nyquist patterns:
sample the received signal at a zero crossing between the first and second consecutive bits;
determine the polarity of the bit transition between the first and second consecutive bits;
determine, based on the polarity of the bit transition and the sample value at the zero crossing between the first and second consecutive bits, whether the sample phase of the bit sample for the second consecutive bit is correct; and
if the sample phase is incorrect, adjust the sample phase of the receiver by a first predetermined amount;
if one or more Nyquist patterns are absent from the bit window, a margin phase detector of the receiver is configured to:
determine a target voltage margin value;
determine a voltage of a cursor bit of the selected window of bit samples;
determine, based on the target voltage margin value and the voltage of the cursor bit, whether the sample phase is correct; and
if the sample phase is incorrect, adjust the sample phase of the receiver by a second predetermined amount;
and wherein a deskew module of the receiver is configured to:
based on the determining if the sample phase of the margin phase detector is correct or incorrect, increment a corresponding value of one of a margin phase early counter and a margin phase late counter;
based on the determining if the sample phase of the bang-bang trap is early or late, increment a corresponding value of one of a bang-bang phase early counter and a bang-bang phase late counter;
determine, for the bit window, a ratio of the bang-bang phase early counter value to the bang-bang phase late counter value;
determine, for the bit window, a ratio of the margin phase early counter value to the margin phase late counter value;
if the bang-bang phase ratio is greater than the margin phase ratio:
reduce the sampling phase of the bang-bang trap by a predetermined step value, wherein reducing the sampling phase moves the sampling phase later in time and if the bang-bang phase ratio is less than the margin phase ratio:
increase the sampling phase of the bang-bang trap by a predetermined step value, wherein increasing the sampling phase moves the sampling phase earlier in time.

21. The receiver of claim 20, wherein:
the bang-bang trap is further configured to:
determine the sample phase is late if one of: (1) the bit transition polarity is 0 to 1, and the sample value at the zero crossing is equal to 1, and (2) the bit transition polarity is 1 to 0 and the sample value at the zero crossing is equal to 0; and
determine the sample phase is early if one of: (1) the bit transition polarity is 0 to 1, and the sample value at the zero crossing is equal to 0, and (2) the bit transition polarity is 1 to 0 and the sample value at the zero crossing is equal to 1; and
the margin phase detector is further configured to:
determine the sample phase is late if the voltage of the cursor bit is greater than the target voltage margin value; and
determine the sample phase is early if the voltage of the cursor bit is less than the target voltage margin value.

22. The receiver of claim 20, wherein the deskew module is further configured to:
   if the bang-bang phase ratio is substantially equal to the margin phase ratio:
     suspend the adjusting of the sampling phase of the bang-bang trap.

23. The receiver of claim 20, wherein the determining by the bang-bang trap and the determining by the margin phase detector are configured to occur substantially concurrently.

24. The receiver of claim 20, wherein the deskew module is further configured to:
   adjust the zero crossing sampling phase of the bang-bang trap thereby calibrating for temperature and process variation of the receiver and for sinusoidal jitter present in the received signal.

* * * * *